(12) United States Patent
Meil et al.

(10) Patent No.: US 11,907,634 B2
(45) Date of Patent: Feb. 20, 2024

(54) AUTOMATING ADDITION OF POWER SUPPLY RAILS, FENCES, AND LEVEL TRANSLATORS TO A MODULAR CIRCUIT DESIGN

(71) Applicant: INTERNATIONAL BUSINESS MACHINES CORPORATION, Armonk, NY (US)

(72) Inventors: Gavin B. Meil, Round Rock, TX (US); Kilaus-Dieter Schubert, Schoenaich (DE); Benedikt Geukes, Stuttgart (DE); Stephen John Barnfield, New York, NY (US); Maya Safieddine, Spring, TX (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 17/464,262

(22) Filed: Sep. 1, 2021

(65) Prior Publication Data

US 2023/0072459 A1 Mar. 9, 2023

(51) Int. Cl.
| | |
|---|---|
| *G06F 1/06* | (2006.01) |
| *G06F 1/26* | (2006.01) |
| *G06F 30/396* | (2020.01) |

(52) U.S. Cl.
CPC .............. *G06F 30/396* (2020.01); *G06F 1/06* (2013.01); *G06F 1/26* (2013.01)

(58) Field of Classification Search
CPC . G06F 30/396; G06F 1/06; G06F 1/26; G06F 1/10; G06F 30/3947; G06F 2119/06
See application file for complete search history.

(56) References Cited

U.S. PATENT DOCUMENTS 5,050,091 A    9/1991 Rubin
5,475,607 A   12/1995 Apte
(Continued)

FOREIGN PATENT DOCUMENTS

CN     112083897 A   12/2020
WO  2015075805 A1    5/2015

OTHER PUBLICATIONS

"Mapper Recovery and Millicode Register Deallocation," Dec. 20, 2018, IPCOM000256698D, 9 pages, ip.com.
(Continued)

*Primary Examiner* — Nghia M Doan
(74) *Attorney, Agent, or Firm* — Brian F. Russell; Nicholas Welling

(57) ABSTRACT

A specification for a modular circuit design includes a mapping from global clock domains to global voltage domains. A processor assigns, to a first instance of a clocked primitive component, a global voltage domain based on which global clock domain clocks the first instance, automatically adds, to the modular circuit design, first power supply rails to power the first instance, and connects the first power supply rails from the first instance to a first power supply for a first global voltage domain. The processor assigns, to a second instance of the clocked primitive component, a second global voltage domain based on which global clock domain clocks the second instance, automatically adds second power supply rails to power the second instance, and connects the second power supply rails to a second power supply for a second global voltage domain. The processor may perform further processing on the updated modular circuit design.

25 Claims, 18 Drawing Sheets

(56) References Cited

U.S. PATENT DOCUMENTS

| | | | |
|---|---|---|---|
| 5,691,662 | A | 11/1997 | Soboleski |
| 6,446,245 | B1 | 9/2002 | Zhaoyun |
| 6,519,749 | B1 | 2/2003 | Chao |
| 6,523,153 | B1 | 2/2003 | Takemura |
| 7,100,133 | B1 | 8/2006 | Meiyappan |
| 7,143,367 | B2 | 11/2006 | Eng |
| 7,739,629 | B2 * | 6/2010 | Wang ............ G06F 30/327 716/109 |
| 7,926,012 | B1 | 4/2011 | Parimi |
| 7,945,875 | B2 * | 5/2011 | Anand ............ G06F 30/35 716/120 |
| 8,015,426 | B2 | 9/2011 | VanStee et al. |
| 8,151,227 | B2 | 4/2012 | Teig |
| 8,584,062 | B2 | 11/2013 | Xia |
| 8,661,383 | B1 | 2/2014 | Dobkin |
| 9,230,047 | B1 | 1/2016 | Van Antwerpen |
| 9,990,461 | B1 | 6/2018 | Colwell |
| 10,068,042 | B1 | 9/2018 | Mendel et al. |
| 10,216,881 | B2 | 2/2019 | Drasny et al. |
| 10,268,797 | B2 | 4/2019 | McElvain |
| 10,325,048 | B1 | 6/2019 | Chillarige |
| 10,372,858 | B2 | 8/2019 | Odiz |
| 10,586,003 | B1 | 3/2020 | Suresh |
| 10,699,045 | B2 | 6/2020 | Mendel et al. |
| 10,762,265 | B1 | 9/2020 | Fang |
| 10,796,048 | B1 | 10/2020 | Azuelos |
| 10,878,154 | B1 | 12/2020 | Badaoui |
| 10,902,175 | B1 | 1/2021 | Surprise |
| 10,911,323 | B2 | 2/2021 | Hiers |
| 10,915,683 | B2 | 2/2021 | Surisetty |
| 11,010,522 | B2 | 5/2021 | Chen |
| 2001/0011212 | A1 | 8/2001 | Raynaud |
| 2003/0033595 | A1 | 2/2003 | Takagi |
| 2003/0046650 | A1 | 3/2003 | Tanaka |
| 2004/0010401 | A1 | 1/2004 | Davis |
| 2007/0124706 | A1 | 5/2007 | Kolpekwar |
| 2007/0288874 | A1 | 12/2007 | Czeck |
| 2008/0222227 | A1 | 9/2008 | Chiang |
| 2008/0288234 | A1 | 11/2008 | Nelson |
| 2009/0288054 | A1 | 11/2009 | Okamoto |
| 2012/0017186 | A1 | 1/2012 | Amundson |
| 2012/0110537 | A1 | 5/2012 | Vedantam |
| 2013/0125097 | A1 | 5/2013 | Ebcioglu |
| 2015/0339424 | A1 | 11/2015 | Chang |
| 2016/0188759 | A1 | 6/2016 | Furuya |
| 2017/0011163 | A1 | 1/2017 | Berry |
| 2019/0179974 | A1 | 6/2019 | El-Zein |
| 2020/0401750 | A1 | 12/2020 | Mondal |
| 2022/0108056 | A1 | 4/2022 | Biswas |
| 2022/0180033 | A1 | 6/2022 | Verma |

OTHER PUBLICATIONS

"Meta-Core Processors," Sep. 17, 2010, IPCOM000199834D, 7 pages, ip.com.
"Method for Fine-Grained Dynamic Voltage and Frequency Scaling for Single-Core and Multi-Core Microarchitectures," Jun. 30, 2006, 6 pages, IPCOM000137920D, ip.com.
"Sub-Threshold Logic for Dual Voltage Supply Chips To Enable Full Chip Power-Gating," Nov. 20, 2008, 4 pages, IPCOM000176698D, ip.com.
"Virtualizing a Back-Plane and a Control and Timing Module Used in a Modular Network Element," Apr. 23, 2021, IPCOM000265563D, 18 pages, ip.com.
"Wave Pipeline Leakage Power Saving Scheme for Digital Circuits," Mar. 9, 2009, 4 pages, IPCOM000180426D, ip.com.
Shin, D. et al., "C-Based Interactive RTL Design Methodology," Dec. 1, 2003, 20 pages, CECS-03-42.
Wawrzynek, J. et al., "Systems Design Lecture 7: Introduction To Hardware Design Patterns," 2010, 46 pages.
Xie, Q. et al., "Function Binding in RTL Design Methodology," Jun. 28, 2001, 18 pages, ICS-01-36.
Appendix P: Listing of IBM Patent Applications and Patents Treated as Related.
"A Graph-Based Modeling Method for Register Coupling in Chip Functional Verification," Feb. 26, 2014, 18 pages, IPCOM000235071D, ip.com.
"A Pseudo-Hierarchy Approach for Improved Performance and Reduced Logic Overhead in Very High Speed Processors," Sep. 21, 2010, 7 pages, IPCOM000199907D, ip.com.
"Congestion Mitigation By Congestion Optimized Library Cell Swapping and Selective Standard Cell Repulsion," Aug. 30, 2012, 10 pages, IPCOM000221143D, ip.com.
"Deterministic Method for Tracking and Reproducing Logic Design Transformations," May 5, 2006, 8 pages, IPCOM000136104D, ip.com.
"Efficient Techniques To Monitor the Strength of Signals in Verilog-HDL Models and Testbenches," Feb. 24, 2006, 17 pages, IPCOM000134136D, ip.com.
"Enabling Back Annotation of Physical Design Optimizations Into RTL Hierarchical HDL Designs," Oct. 19, 2017, 7 pages, IPCOM000251161D, ip.com.
"Linear Resolution Proofs of Combinatorial Equivalence of Logic Transformation," Jul. 3, 2008, 9 pages, IPCOM000199456D, ip.com.
"Mechanism To Restore Hierarchy To a "Flattened" Digital-Logic Design," Oct. 29, 2009, 5 pates, IPCOM000189147D, ip.com.
"Method and System for Enhanced Formal and Semi-Formal Verification Using Simulation, Reduction, and Case-Splitting Strategies," Nov. 27, 2011, 10 pages, IPCOM000212747D, ip.com.
"Methodology To Validate Limited Changes To Pre-Validated IP Cores," Jul. 3, 2008, 9 pages, IPCOM000172211D, ip.com.
A. Vidal-Obiols, J. Cortadella, J. Petit, M. Galceran-Oms and F. Martorell, "RTL-Aware Dataflow-Driven Macro Placement," 2019 Design, Automation & Test in Europe Conference & Exhibition, Florence, Italy, 2019, pp. 186-191.
Carstens, J., "Makefile Generation for Mixed HDL Designs," Apr. 25, 2004, 2 pages, PCOM000022642D, ip.com.
Chu, P., Introduction To Digital System Design—RTL Hardware Design, 44 pages.
Chu, PP., "RTL Hardware Design Using VHDL," 2006, 696 pages, John Wiley & Sons, Inc., Hoboken, NJ, USA.
D. Howland and R. Tessier, "RTL dynamic power optimization for FPGAs," 2008 51st Midwest Symposium on Circuits and Systems, Knoxville, TN, USA, 2008, pp. 714-717, doi: 10.1109/MWSCAS. 2008.4616899.
Gerstlauer, A., "Embedded System Design and Modeling—System Design Flow and Methodology," 2008, 37 pages.
Ghazy, AA. et al., "Openlane: The Open-Source Digital ASIC Imlementation Flow," 2020, 5 pages.
Muhammad, W. et al., "Semantic Preserving RTL Transformation for Control-Data Slicing in Virtual IPs," 2007 IEEE International Multitopic Conference, Lahore, Pakistan, 2007, pp. 1-6, doi: 10.1109/INMIC.2007.4557700.
Nigir, ME., "High Level Synthesis of Neural Network Chips," Feb. 1993, University Collecge, London, UK.
EDA for IC Implementation, Circuit Design, and Process Technology, Scheffer, L. et al., 2006.
Method for Fine-Grained Dynamic Voltage and Frequency Scaling for Single-Core and Multi-Core Microarchitectures Anonymously; Jun. 30, 2006.
Wave Pipeline Leakage Power Saving Scheme for Digital Circuits; Anonymously; Mar. 9, 2009.
Subthreshold Logic for Dual Voltage Supply Chips to Enable Full Chip Powergating; Anonymously; Nov. 20, 2008.

* cited by examiner

AUTOMATING ADDITION OF POWER SUPPLY RAILS, FENCES, AND LEVEL TRANSLATORS TO A MODULAR CIRCUIT DESIGN

BACKGROUND OF THE INVENTION

This disclosure relates to modeling integrated circuits and, more particularly, to the automated addition of power supply rails, fences, and level translators to a modular circuit design.

Modern processor and system-on-chip designs often have multiple voltage domains for a variety of reasons. For example, diverse circuit functions, licensed-in third party modules, and standard interfaces (e.g., PCIe) may all have differing voltage requirements. The need to isolate errors caused by manufacturing defects and/or the need to limit power consumption may require turning off or lowering the voltage supplies to specific voltage domains of an integrated circuit chip. For each such voltage domain, designers must enumerate in the circuit design files statements that connect the correct power supply rails (i.e., power and ground signals) to each circuit component and route power supply rails to the correct power sources. Designers must also identify signal crossings between voltage domains and include statements in the circuit design files to insert any required devices (e.g., fences or voltage level translators) at those signal crossings. As the number of voltage domains increases in an integrated circuit design, the burden on designers and the probability of bugs in the design concomitantly increase. Bugs introduced at this point in the circuit design may not be caught until late in the design process, for example, when electrical checks are performed.

The present disclosure appreciates that it would be desirable to automate the insertion of voltage rails, fences, and level translators to eliminate the need for designers to manually perform these tasks. The automation of the insertion of voltage rails, fences, and level translators would increase designer productivity, eliminate designer-introduced bugs in these design aspects, create a more consistent and thus debuggable design, and provide flexibility to adapt to changing design requirements without costly redesign.

The present disclosure additionally appreciates that it would also be desirable to similarly automate the insertion of fences at crossings between asynchronous clock domains. Such fences are utilized, for example, to ensure predictability of self-test or manufacturing test operations.

Further, the present disclosure appreciates that it would be desirable to automate the insertion of voltage rails, fences, and level translators into a modular (pre-flattened) representation of the integrated circuit design (e.g., the hardware description language (HDL) files that describe the integrated circuit design) so that all of the automated modifications to the integrated circuit design can be verified using the normal design verification flow, for example, utilizing logic simulation and/or formal verification.

BRIEF SUMMARY

In some embodiments, an automated design tool automatically inserts power supply rails, fences, and level translators into a modular circuit design. The modular circuit design can be composed of modules described by design files written in a hardware description language (HDL), such as Verilog or VHDL. An input specification, which may be specified in a separate file or files, lists the global clock and voltage domains for the integrated circuit chip and any constraints on crossings between clock or voltage domains. The automated design tool reads the design and specification files, propagates clock information through the design hierarchy, and uses a specified mapping from clock to voltage domains to determine in which voltage domain each clocked primitive component should be placed, adding and connecting power and ground rails to those clocked primitive components and their enclosing modules. The automated design tool also localizes global crossing specifications to each module, traverses the logic within each module to identify crossings between domains, and inserts fences and level translators. The automated design tool can additionally write new HDL files describing the updated modular circuit design.

In some embodiments, a specification for a modular circuit design includes a mapping from global clock domains to global voltage domains. A processor assigns, to a first instance of a clocked primitive component, a global voltage domain based on which global clock domain clocks the first instance, automatically adds, to the modular circuit design, first power supply rails to power the first instance, and connects the first power supply rails from the first instance to a first power supply for a first global voltage domain. The processor assigns, to a second instance of the clocked primitive component, a second global voltage domain based on which global clock domain clocks the second instance, automatically adds second power supply rails to power the second instance, and connects the second power supply rails to a second power supply for a second global voltage domain. The processor may then perform further processing on the updated modular circuit design, for example, including storing, in data storage, one or more design files describing the updated modular circuit design.

In some embodiments, a processor receives a list of global constraints for crossings between global clock domains within a modular circuit design including a plurality of hierarchically arranged instances of modules. The processor creates a list of local constraints for crossings between local clock domains of a module in the modular circuit design based on a first mapping from local clock domains to global clock domains at a first instance of the module. The processor modifies the list of local constraints for crossings between local clock domains of the module based on a second mapping from local clock domains to global clock domains at a second instance of the module, such that the resulting list of local constraints satisfies the list of global constraints at both the first instance and the second instance of the module. The processor classifies component pins of the module into clock domains in a manner to satisfy the list of local constraints. The processor automatically inserts into the modular circuit design a component at a pin at which a crossing occurs between different clock domains in order to satisfy the list of local constraints. The processor may then perform further processing on the output modular circuit design, for example, by storing, in data storage, output design files describing the output modular circuit design as updated by the insertion of the component.

DETAILED DESCRIPTION

Hardware description languages (HDLs), such as VHDL and Verilog, enable the description of an integrated circuit design in a modular, hierarchical fashion. A module (or "entity/architecture" in VHDL) can describe one component of the modular circuit design by listing instances of subcomponents and the interconnections there between. An instance can be a reference to a primitive circuit component, such as a logic gate or flip-flop, or a reference to another module. In the latter case, the instance, which can be referred to as a "module instance," "child instance," or "nonprimitive instance," directs the circuit construction process (e.g., logic synthesis) to substitute the contents of the referenced module for the instance. A hierarchical circuit design is one in which some module, called the top-level module, instantiates one or more other modules, which may in turn instantiate one or more other modules, and so on. For ease of reference, the present disclosure employs a naming convention in which an instance of a module (or entity) has a name of the form: [instance name]:[module name].

Figure 1:
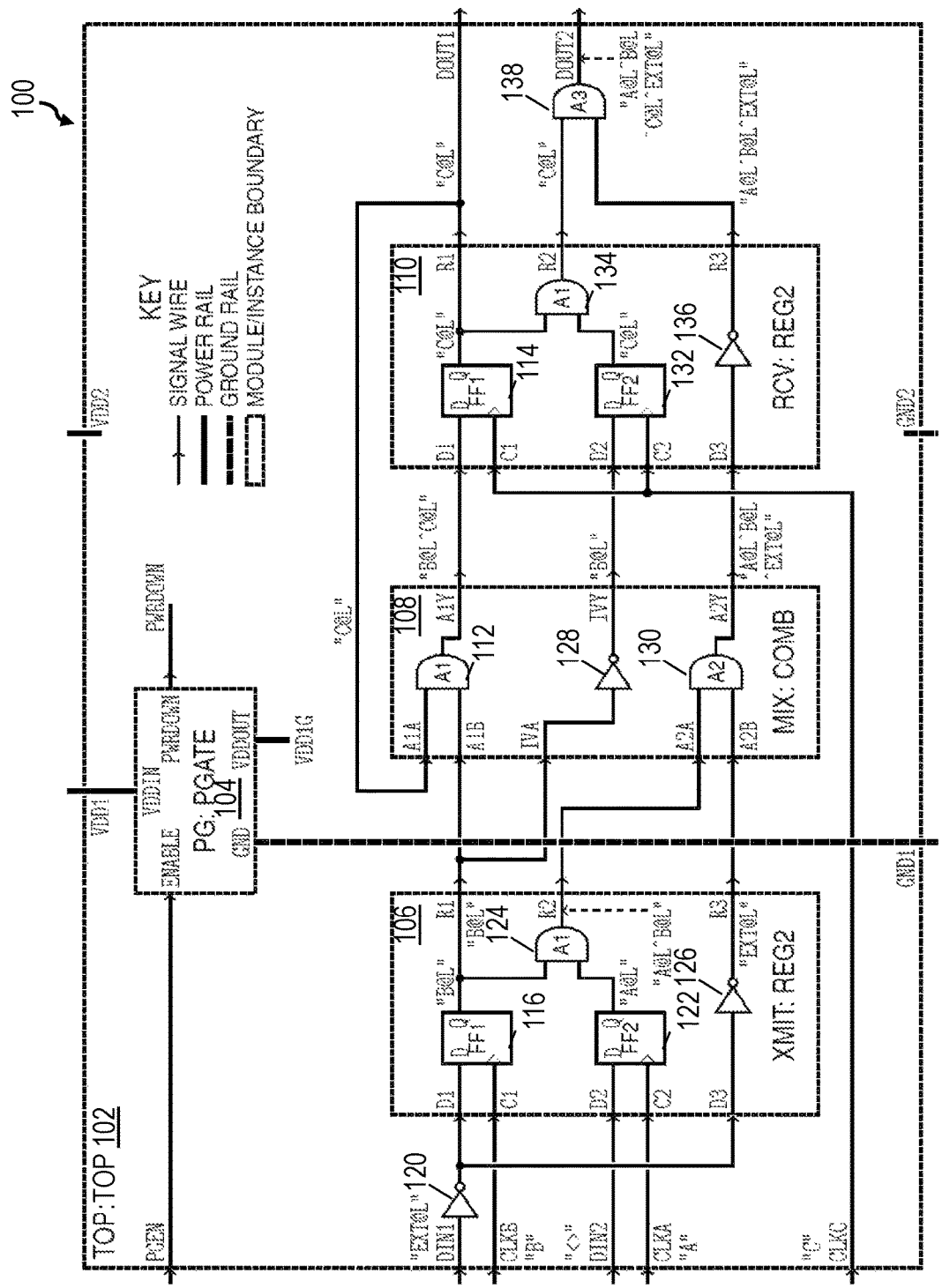
FIG. 1 is a block diagram of an exemplary modular circuit design.

FIG. 1 is a block diagram of an exemplary modular circuit design 100 into which power supply rails, fences, and level translators may be automatically inserted in accordance with one embodiment. In this simple example, modular circuit design 100 includes two hierarchically arranged levels. A top-level module instance 102, named TOP:TOP, instantiates four lower-level instances 104, 106, 108, 110, which are named PG:PGATE, XMIT:REG2, MIX:COMB, and RCV: REG2, respectively. As indicated, modular circuit design 100 includes only single instances of modules PGATE and COMB, but includes two instances of module REG2. In accordance with one aspect of the modular design methodology disclosed herein, all instances of a given module remain identical regardless of the automated updates to modular circuit design 100 made herein, as described further below.

In a typical implementation, each module utilized to construct a modular circuit design is separately described in its own respective HDL file. For example, module TOP may be described in a design file named "top.vhdl", and module REG2 may be described in a separate design filed named "reg2.vhdl". Similarly, the contents of modules PGATE and COMB may be defined in separate files (e.g., "pgate.vhdl" and "comb.vhdl"). Although FIG. 1 illustrates the primitive contents of its constituent modules inside the boundary of module TOP, this illustration is made only for the purpose of presenting the overall integrated circuit design. It should be understood that the contents of the constituent modules (e.g., flip-flops FF1 and FF2 in REG2) would actually be enumerated only in the design file "reg2.vhdl" and not in the design file "top.vhdl". Thus, for example, with respect to module REG2, design file "top.vhdl" would contain only the instances (named XMIT and RCV) that refer to module REG2. The contents of the two instances XMIT and RCV depicted in FIG. 1 are necessarily identical because the contents are defined only once, within design file "reg2.vhdl".

The inputs and outputs of each module are collectively called ports. Each port corresponds to a pin of each instance of the given module. For example, input port C1 of module REG2 corresponds to pin C1 of instance XMIT:REG2 (which is in turn connected to input port CLKB of module TOP) and to pin C1 of instance RCV:REG2 (which is connected to input port CLKC of module TOP).

The module PGATE represents a gated power supply. When its ENABLE input is driven to a logical '1' value, it will couple power received on its VDDIN port to its VDDOUT port. Otherwise, its VDDOUT port will be in a high-impedance state, meaning that no power is being supplied. Such a gated power supply module can be used, for example, to turn off power to a section of the circuit (called a "voltage island") when the section is not being used, in order to save power. Module PGATE has a PWRDOWN output port that is driven high (e.g. to '1') whenever the VDDOUT port is not at a stable supply voltage. This output is intended to be used to control fences (also called "isolation cells") interposed between the voltage island and other parts of a circuit. However, no fences are shown in modular circuit design 100 of FIG. 1. In accordance with one aspect of the disclosed inventions, fences are inserted into modular circuit design 100 in an automated fashion.

Module PGATE is also an example of a "black box." If a module is designated as a black box by the input specification, the design process described herein will not analyze or modify its contents. Accordingly, any "black box" module must already have all necessary power supply and ground ports, and its internal components must already be connected to the power supply rails as needed.

As further illustrated in FIG. 1, the TOP, REG2, and COMB modules also contain primitive circuit components (e.g., flip-flops and logic gates). For example, the REG2 module includes flip-flops FF1 and FF2, AND gate A1, and an inverter (which are respectively identified by reference numerals 116, 122, 124, and 126 in instance 106 and reference numerals 114, 132, 134, and 136 in instance 110). The COMB module includes AND gates A1 112, inverter 128, and AND gate A2 130. A primitive circuit component is one which cannot be further decomposed into subcomponents and which has a single power and ground terminal. A primitive circuit component may correspond to an assignment statement in an HDL. In this case, the inputs of the component are the signals referenced by the assignment statement, and the outputs are the signals being assigned.

One aspect of the design process described herein is to assign each primitive circuit component (that does not reside within a black box) to a single voltage domain and to connect its power and ground terminals to the power and ground rails of its voltage domain. Even if the primitive circuit component is later replaced or combined with other primitive circuit components by the circuit construction process (e.g., in logic synthesis), the circuit construction process should be able to identify the voltage domain associated with the original component in order to properly make such changes.

In at least some embodiments, the design process distinguishes two types of primitive components: clocked and non-clocked. A clocked primitive component (CPC) has a clock input pin that is attached to a clock signal. A CPC is typically either a storage element (e.g., a latch or flip-flop) or part of a clock distribution network (e.g., a buffer, clock multiplexer, or clock divider). In cases in which a primitive component has multiple clock inputs (such as a clock multiplexer) exactly one input must be designated as the "classifying input," meaning that the primitive component will be powered based on the clock domain driving that classifying input.

Modular circuit design 100 of FIG. 1 has two top-level power supply ports, called VDD1 and VDD2, and two corresponding ground ports, called GND1 and GND2. (In other cases, a circuit design can have only one ground port for multiple power supplies.) Modular circuit design 100 also has an internal gated power supply signal, called VDD1G. Other than the connections to gated power supply instance 104, there are no connections from the power and ground ports to internal components.

In at least some embodiments, the automated insertion of power supply rails, fences, and level translators is controlled by an input specification. In some examples, the input specification has two parts: a global specification and an optional module-specific specification. In some examples, the global specification includes two tables: a Global Domain Definition (GDD) table and a Global Domain Crossing Constraints (GDCC) table.

Table I below is an example of a GDD table. The GDD table defines four global clock domains, named EXT, CLKA, CLKB, and CLKC; three global power domains, named VDD1, VDD1G, and VDD2; and two global ground domains, named GND1 and GND2. Each clock domain is assigned one power domain, and each power domain is assigned one ground domain. Thus, there must be an N-to-1 mapping from clock to power domains and from power to ground domains.

TABLE I

Global Domain Definition
(GDD) table

| Clock | Power | Ground |
|---|---|---|
| EXT | VDD1 | GND1 |
| CLKA | | |
| CLKB | VDD1G | |
| CLKC | VDD2 | GND2 |

Table II below shows an example of a GDCC table. The GDCC table specifies, for every permutation of two global clock domains, what constraints apply to signals that cross from the first domain to the second domain.

TABLE II

Global Domain Crossing Constraints (GDCC) table

| Clock Domain Crossing Source Domain → Sink Domain | Handling | Allow False Crossing? | Fence Control |
|---|---|---|---|
| EXT → CLKA | DIRECT | yes | N/A |
| EXT → CLKB | DIRECT | NO | N/A |
| EXT → CLKC | ILLEGAL | N/A | N/A |
| CLKA → EXT | ILLEGAL | N/A | N/A |
| CLKA → CLKB | DIRECT | NO | N/A |
| CLKA → CLKC | TRANS | yes | none |
| CLKB → EXT | ILLEGAL | N/A | N/A |
| CLKB → CLKA | FENCE-OUT | yes | PWRDOWN |
| CLKB → CLKC | TRANS | yes | PWRDOWN |
| CLKC → any | ILLEGAL | N/A | N/A |

In Table II, three types of constraints are shown in columns 2, 3 and 4. Column 2 specifies the handling of the domain crossings indicated by column 1. The values of handling have the following meanings:

DIRECT: there are no constraints on the given crossing, meaning no fence or level translator is needed;

ILLEGAL: the crossing is not allowed. If such a crossing is detected in the design, the crossing is reported as a design error, but will not be modified.

TRANS: the crossing requires a level translator.

FENCE-IN: the crossing requires a fence powered by the input (source) domain.

FENCE-OUT: the crossing requires a fence powered by the output (sink) domain.

Column 3 of Table II specifies whether or not false crossings between clock domains are allowed. A false crossing occurs if a port or primitive component is classified in a clock domain such that there is a crossing to or from a different clock domain that would not have otherwise existed. For example, consider AND gate A1 112 inside instance MIX:COMB 108 in FIG. 1. If AND gate A1 112 is classified in the CLKB domain, then the path from flip-flop FF1 114 of instance 110 (named RCV:REG2) to AND gate A1 112 would be a crossing from the CLKC domain to the CLKB domain. (Flip-flop FF1 114 is in the CLKC domain because its clock pin is connected to clock signal CLKC.) This signal crossing would be a "false crossing" because the signal crossing is created by the clock domain assignment and not by the design topology. That is, without the clock domain assignment, there would not necessarily be any CLKC-to-CLKB crossing present in modular circuit design 100. A CLKC-to-CLKB crossing is disallowed by the input specification shown in Table II, which prevents assignment of the AND gate A1 112 in module instance 108 (i.e., MIX:COMB) to the CLKB domain. Instead, AND gate A1 112 is assigned to the CLKC domain. This assignment will result in a clock domain crossing from flip-flip FF1 116 inside instance 106 (named XMIT:REG2), which is in the CLKB domain (due to its clock pin being connected to clock signal CLKB), to AND gate A1 112, which is in the CLKC domain. This clock domain assignment is not a false crossing because there is already a CLKB-to-CLKC crossing from flip-flop FF1 116 to flip-flop FF1 114.

Column 4 of Table II specifies which top-level signal should be connected to a fence or level translator to control when the fence or level translator is in an isolation state (blocking transmissions from input to output). In the case of a level translator, such a control is optional. If not present, indicated by the word "none" in Column 4 of Table II, the level translator will always transmit signals from input to output. In this case, the level translator's fence control input pin will be tied inactive.

The GDCC table may optionally contain other fields to further constrain or direct the treatment of each crossing. For example, these further constraints can include which type of fence or level translator component to use or whether to place a fence or level translator closer to the source or sink of a crossing.

In addition to the global specification, the input specification may include optional module-specific specifications. Such specifications may include whether a given module is to be treated as a black box, in which clock domains certain ports or components should be classified, or where to place fences or level translators. In general, the automated design tool allows the user to manually override its automated decisions.

Those skilled in the art will appreciate that it is not necessary for the GDCC table to explicitly list every permutation of domains. For example, in some embodiments, a default handling (e.g., of illegal) may be implied for any permutation not listed. Furthermore, in some embodiments, it may be sufficient for the GDCC table to list constraints by permutations of voltage domains instead of or in addition to permutations of clock domains. For example, if there is no variation of constraints among the clock domains associated with a given voltage domain, it may be sufficient to list only the given voltage domain. In addition, an embodiment may establish an order of precedence such that a first constraint referencing a clock domain takes precedence over a second constraint referencing the voltage domain associated with the clock domain.

Figure 2A:
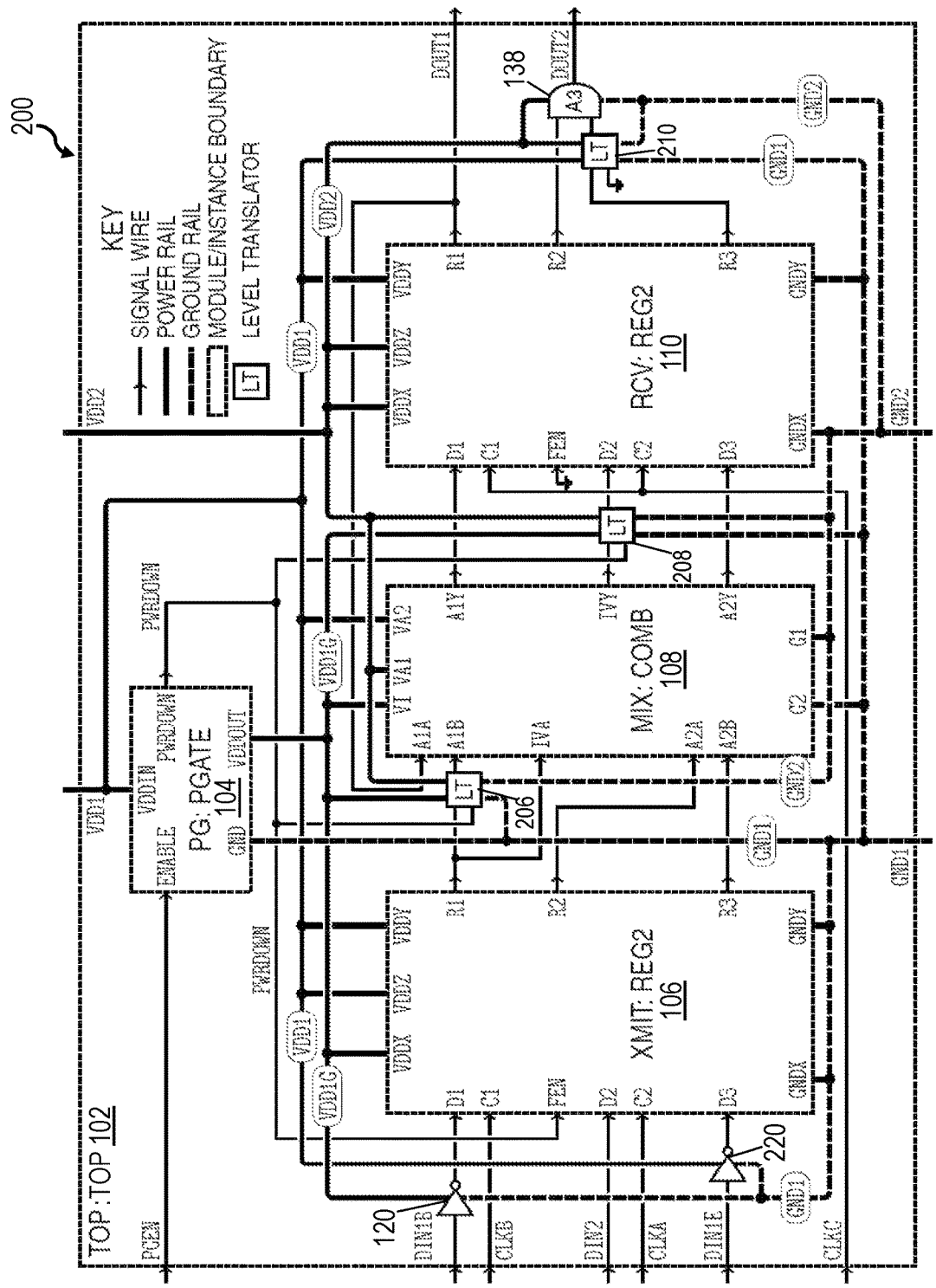
FIGS. 2A-2D are block diagrams of the exemplary modular circuit design as updated by an automated design tool in accordance with one embodiment.
Figure 2D:
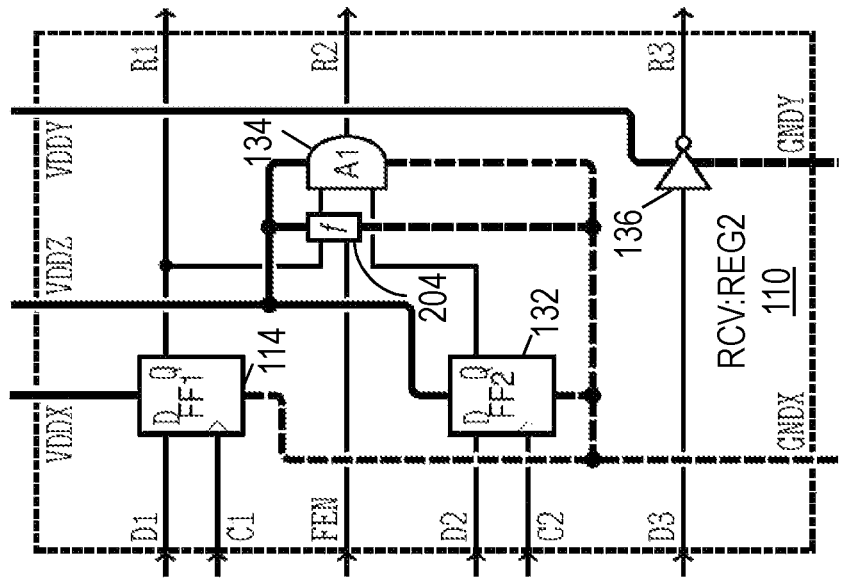
Figure 2C:
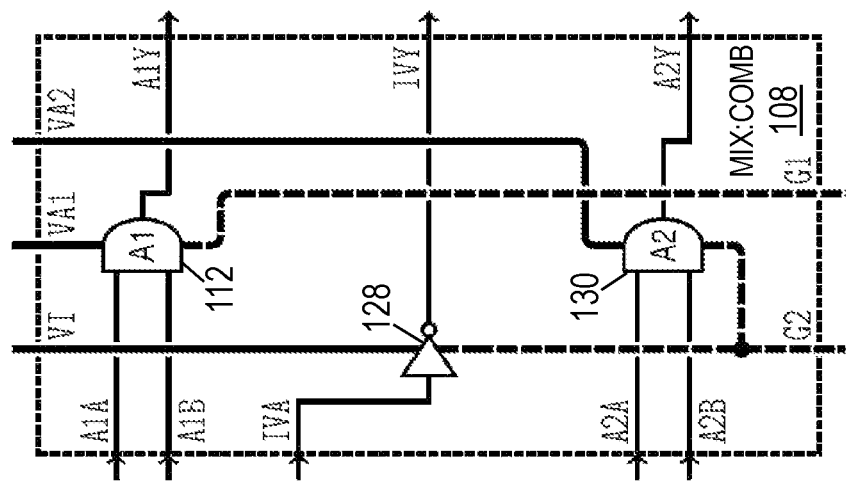
Figure 2B:
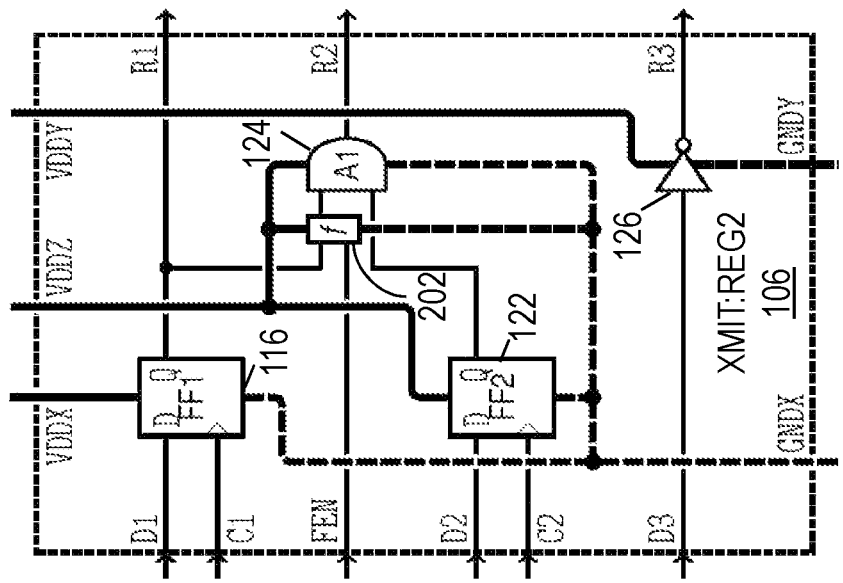

With reference now to FIGS. 2A-2D, there are illustrated block diagrams of an exemplary modular circuit design 200, which reflect automatic updates by an automated design tool to the modular circuit design 100 of FIG. 1 in accordance with one embodiment. In particular, FIG. 2A generally illustrates clock, power, and ground connections to the pins of instances 104, 106, 108, and 110, and FIGS. 2B-2D illustrate the internal details of instances 106, 108 and 110, respectively.

As shown, modular circuit design 200 has power and ground supply signals ("rails") connecting every primitive component to one of the global power supply rails (VDD1, VDD1G or VDD2) and one of the ground rails (GND1 or GND2). As one example, FIGS. 2A and 2B collectively illustrate that the automated design tool has automatically connected all primitive components within instance 106 to ground rail GND1. Further, within instance 106, the automated design tool has automatically connected flip-flop FF1 116 to global power supply rail VDD1G and connected flip-flop FF2 122, AND gate A1 124, and inverter 126 to global power supply rail VDD1. Where these power and ground rails cross the boundary of a module, the automated design tool has added power and ground ports if they did not already exist and has connected the corresponding power and ground pins of instances of the module to higher level rails. For example, the automated design tool has automatically created power ports VDDX, VDDY, and VDDZ and ground ports GNDX and GNDY on module REG2.

As can also be seen by comparison of FIGS. 1 and 2A-B, the automated design tool has automatically updated modular circuit design 200 to include a fence (f) inside module REG2 and three level translators (LT) inside module TOP. The addition of these elements to the modules results in the insertion of fence 202 in instance 106 and fence 204 in instance 110, as well as LTs 206, 208, and 210 in instance TOP:TOP 102.

The automated design tool has also split top-level input port DINT of module TOP into two ports, DIN1B and DIN1E, and replicated or "cloned" the inverter 120 that was sinking that input port by creating inverter 220 in module TOP. In at least some embodiments, the automated design tool will do such port splitting and primitive cloning only if the input specification permits such splitting and cloning and only if the splitting and cloning is required to satisfy the constraints imposed by the input specification (e.g., to avoid creating a prohibited false crossing).

It is important to note that, as shown in FIGS. 2B and 2D, the automated design tool maintains the contents of the two instances 106, 110 of module REG2 as identical, even after all modifications have been made. Because the automated design tool operates on the modular design and produces a modified modular design, the automated design tool is therefore not free to make changes specific to one instance of a module. The operation of the automated design tool is therefore distinct from logic synthesis, for example, which typically operates on a "flat design" consisting of only primitive components. The automated design tool instead modifies each module so that all instances satisfy the constraints imposed by the input specification.

It should be appreciated that although the invention is capable of connecting every primitive component to a global power rail and a global ground rail as illustrated in FIGS. 2A-2D, the automated design tool may not be required to explicitly write such connections to the output design files. For example, in such embodiments, the automated design tool can provide attributes in the design files so that a design construction tool that receives the design files as inputs can determine in which voltage domain every component must be placed.

Figure 3:
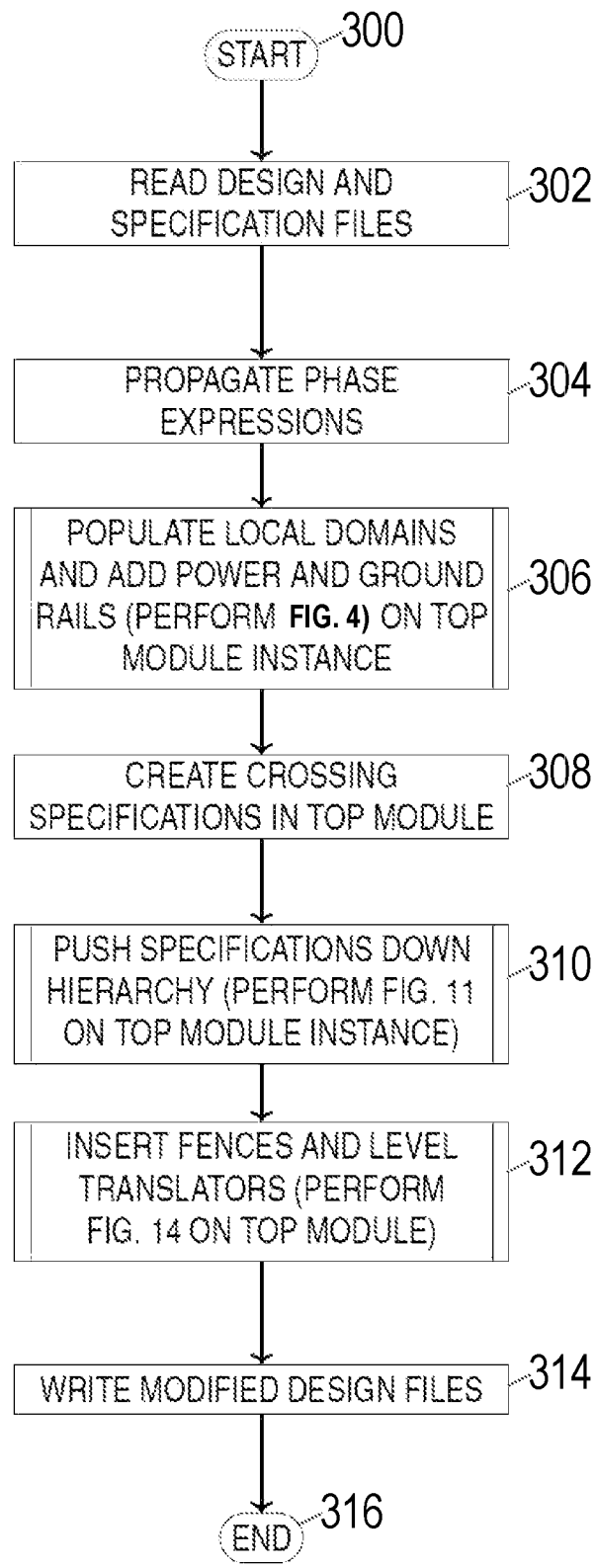
FIG. 3 is a high-level logical flowchart of an exemplary process to automatically insert voltage rails, fences, and level translators into a modular circuit design to obtain an updated modular circuit design in accordance with one embodiment.

With reference now to FIG. 3, there is illustrated a high-level logical flowchart of an exemplary process by which an automated design tool automatically insert voltage rails, fences, and level translators into a modular circuit design 100 to obtain an updated modular circuit design 200 in accordance with one embodiment.

The process of FIG. 3 begins at block 300 and then proceeds to block 302, which illustrates the automated design tool reading the HDL file(s) describing the constituent modules of a modular circuit design 100 and the input specification file(s). The process then proceeds to block 304.

Block 304 illustrates the automated design tool analyzing the clocking of the modular circuit design 100 and propagating "phase expressions" throughout the modular circuit design to indicate which clocks cause transitions on each net in the modular circuit design and the types of those transitions (e.g., clock waveforms or data waveforms). In some embodiments, the automated design tool calls a separate tool to propagate phase expressions in modular circuit design 100. For example, one such phrase expression propagation tool is described in U.S. Pat. No. 10,216,881, which is incorporated herein by reference. The result of the propagation of the phase expressions is shown in FIG. 1 in the text strings enclosed in double quotes. The phase expressions "A", "B", and "C" indicate that the corresponding signal carries a clock waveform generated by virtual clock A, B, or C, respectively. A "virtual clock" is an abstract source of signal transitions that corresponds to an oscillator that may exist either inside or outside the design. In the example given in FIG. 1, virtual clocks A, B and C correspond to the clock signals CLKA, CLKB and CLKC, respectively. In addition, the inserted phase expressions reference a virtual clock named EXT that does not correspond to any clock signal inside the input modular circuit design 100 (but presumably refers to some oscillator external to modular circuit design 100).

In the phase expressions, the suffix "@L" indicates the signal does not carry a clock waveform, but instead carries a data waveform originating from a storage element (e.g., flip-flop) clocked by the specified virtual clock. For example, the phase expression "A@L" associated with the output of flip-flop FF2 122 indicates the output signal is clocked by virtual clock A. The caret symbol (i.e., "^") within a phase expression is a transition union operator that indicates that the associated signal may carry transitions from multiple clock domains. For example, the phase expression "A@L^B@L" associated with output of AND gate A1 124 means the output signal may carry transitions launched by flip-flops (e.g., flip-flop FF1 116 and flip-flop FF2 122) clocked by both virtual clocks A and B. The phase expression "< >", as shown for input port DIN2 of module TOP 102, means that no information is known regarding the clocking or waveforms present on the given signal. It should be noted that the phase expressions shown in FIG. 1 are "global" in that they are independent of module boundaries. That is, the phase expressions are those that would result from analyzing a flattened representation of the modular circuit design. In a preferred embodiment, such analysis is performed without actually flattening the modular circuit design.

In a preferred embodiment, the automated design tool enforces a one-to-one correspondence between the virtual clocks referenced in phase expressions generated at block 304 and the global clock domains listed in the GDD table. This one-to-one correspondence can be established in multiple ways. For example, in some embodiments, the separate phase expression propagation tool receives as inputs the GDD table and a mapping from global clock domains to virtual clocks and the signals or clock generation components in the design. In other embodiments, the input design files include specifications that associate signals in the design with global clock domains. The virtual clocks A, B, C and EXT referenced by the phase expressions shown in FIG. 1 are associated with global clock domains CLKA, CLKB, CLKC and EXT, respectively, in the GDD table of Table I.

Following block 304, the process of FIG. 3 proceeds to block 306, which illustrates the automated design tool populating each module with local clock, power and ground domains. Because the automated design tool operates on modular circuit designs, the contents of each module (power and ground rails, fences and level translators) must be compatible with every instance of the module in a modular circuit design. In at least some embodiments, the automated design tool achieves this cross-module compatibility by creating per-module local domains that are then mapped across the hierarchy to global domains. The local-to-global mapping is permitted to be different for each instance of the module. Each local clock domain within a module must be assigned one local power domain, and each local power domain must be assigned one ground domain. Thus, there must be an N-to-1 mapping from local clock to local power domains and from local power to local ground domains, within each module.

In at least some embodiments, the operations depicted at block 306 can be performed during a depth-first traversal of a hierarchical instance tree formed of all module instances in the modular circuit design. In this case, the root node of the tree corresponds to the top-level instance (e.g., TOP:TOP instance 102) and the leaf nodes correspond to module instances 104, 106, 108, and 110 within instance 102. Because exemplary modular circuit design 100 has only two levels of hierarchy, the hierarchical instance tree has only two levels of nodes (the root node and its four leaf nodes). In practice, however, a large complex integrated circuit design may have many levels of hierarchy.

Figure 4:
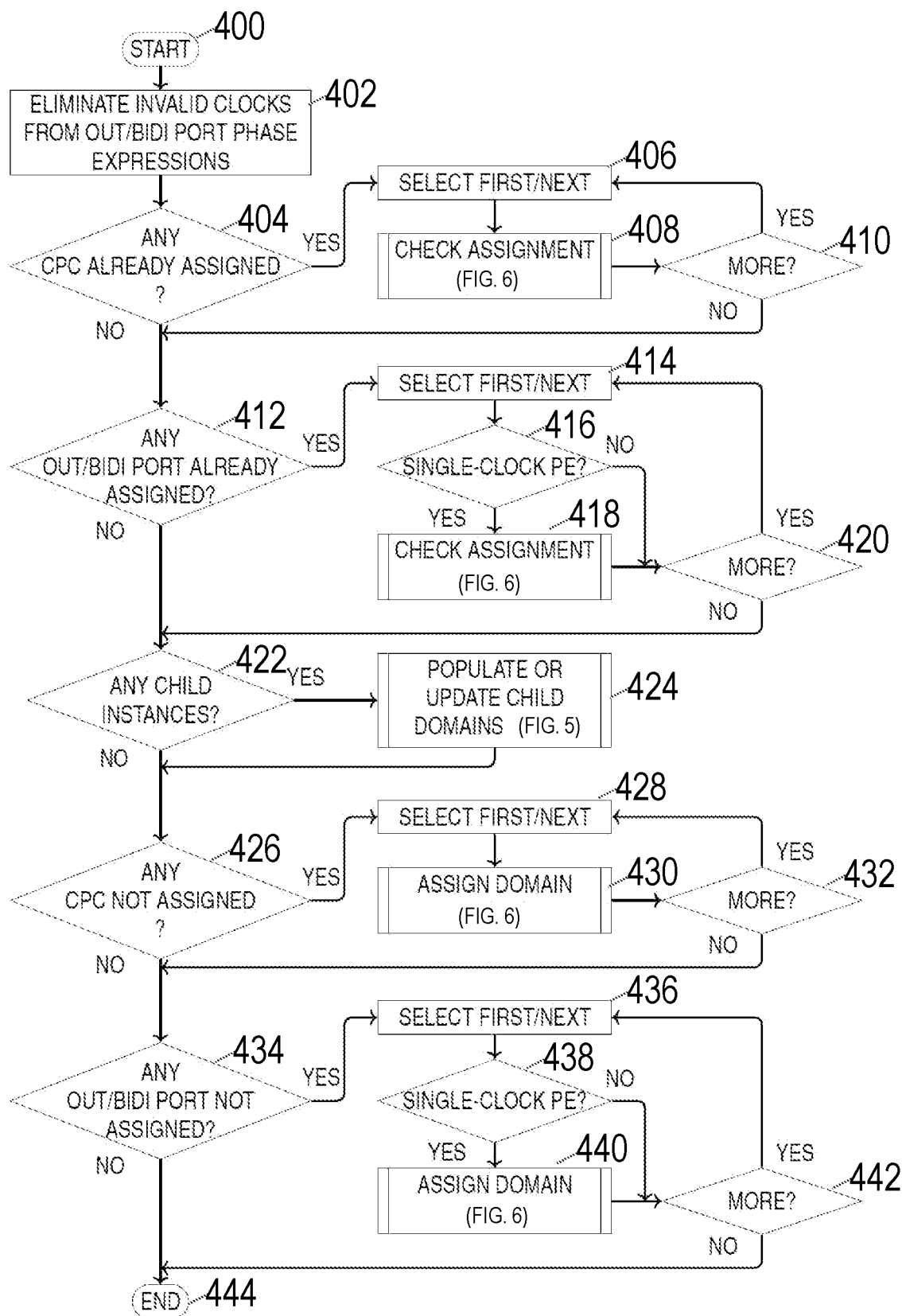
FIG. 4 is a high-level logical flowchart of an exemplary process for populating or updating local clock domains in accordance with one embodiment.

In the illustrated embodiment, the operations depicted at block 306 are depicted in the flowcharts given in FIGS. 4 through 8. In this example, the process of FIG. 4 is first applied to the top-level module instance (e.g., TOP:TOP instance 102). The process of FIG. 4 calls the process of FIG. 5 if there are child instances, and FIG. 5 in turn recursively calls FIG. 4 on each child instance. In this manner, the process will visit every instance of every module. However, the illustrated embodiment of the process refrains from visiting instances of black box modules (e.g., PG:PGATE 104). At each instance processed by the process of FIG. 4, the automated design tool attempts to assign to each CPC and each output or bi-directional (bidi) port a local clock domain and map that local clock domain to a target global clock domain. The automated design tool determines the target global clock domain of a CPC by the virtual clock referenced by the phase expression propagated to its clock pin at block 304. The automated design tool can also determine the target global clock domain of an output or bidi port if the phase expression of that port refers to only one virtual clock. Such a phase expression indicates that the port's assigned local clock domain can be mapped to the global clock domain corresponding to the single virtual clock without causing a false crossing.

Referring now to FIG. 4, there is depicted a high-level logical flowchart of an exemplary process for populating or updating local clock domains in accordance with one embodiment. The process of FIG. 4 begins at block 400 and then proceeds to block 402, which illustrates that, before attempting to classify an output or bi-directional (bidi) port, the automated design tool eliminates from consideration virtual clocks, if any, that are referenced by the phase expression of that port that would potentially cause a disallowed clock crossing. For example, when visiting instance 108 (named MIX:COMB), the automated design tool determines that output port A1Y has phase expression "B@L^@L", indicating a union of global clock domains CLKB and CLKC. As such, the automated design tool infers that, at this instance, output port A1Y receives transitions from both CLKB and CLKC domains. Consequently, assigning output port A1Y to either clock domain may potentially cause a false crossing from the other clock domain. However, according to the GDCC table (see, e.g., Table II), false crossings from the clock domain of CLKB to the clock domain of CLKC are allowed, whereas no crossings from the clock domain of CLKC to the clock domain of CLKB are allowed. Therefore, at block 402, CLKB is eliminated from consideration when classifying output port A1Y.

The process the proceeds from block 402 to blocks 404 and 412, which illustrate determinations whether any CPC has already been assigned a local clock domain (block 404) and whether any output or bidi port has already been assigned a local clock domain (block 412). Local domain assignments are made per module, not per instance. Therefore, it is possible at any given instance that a CPC or output or bidi port already has a local clock domain assignment made when FIG. 4 was previously applied to a different instance of the same module. The mapping of each local clock domain to a target global clock domain is made per instance, not per module. Therefore, even if a given CPC or output or bidi port already has a local clock domain assignment made at a different instance, each such local clock domain will still need to be mapped to a global clock domain at the present instance. In response to an affirmative determination at block 404, the automated design tool processes each CPC that has already been assigned in turn in a loop including blocks 406, 408, and 410. At block 406, the automated design tool selects a first or next CPC to process (block 406) and checks the domain assignment of the CPC utilizing the process of FIG. 6 (block 408). The process of FIG. 6 will check that the local clock domain currently assigned to the CPC can be mapped to the CPC's target global clock domain, reassigning the CPC if necessary and permitted. Following block 408, the automated design tool determines at block 410 whether or not all CPCs detected at block 404 have been processed. If not, the process returns to block 406, which has been described. If, however, all CPCs detected at block 404 have been processed through the process of FIG. 6, the process proceeds to block 412.

In response to a negative determination at block 412, the process passes to block 422, which is described below. If, however, an affirmative determination is made at block 412, the automated design tool processes each output/bidi port in turn in a loop including blocks 414, 416, 418, and 420. At block 414, the automated design tool selects a first or next output port or bidi port to process. The automated design tool determines at block 416 if the selected port has a phase expression referring to only one virtual clock, after eliminating invalid virtual clocks in block 402. Such a phase expression indicates that the port's currently assigned local clock domain can be mapped to the global clock domain corresponding to the single virtual clock without causing a false crossing. If a negative determination is made at block 416, the process passes directly to block 420, which is described below. If, however, an affirmative determination is made at block 416, the automated design tool checks the domain assignment of the port utilizing the process of FIG. 6 (block 418). The process of FIG. 6 will check that the local clock domain currently assigned to the port can be mapped to the port's target global clock domain (the global clock domain corresponding to the virtual clock referenced by the port's phase expression), reassigning the port if necessary and permitted. Following block 418, the automated design tool determines at block 420 whether or not all ports detected at block 412 have been processed. If not, the process returns to block 414, which has been described. If, however, all ports detected at block 412 have been processed through the process of FIG. 6, the process proceeds to block 422.

Block 422 depicts the automated design tool determining whether or not the present instance has any child instance(s) in the hierarchical instance tree. If not, the process passes to block 426, which is described below. If, however, an affirmative determination is made at block 422, the automated design tool attempts to populate or update local clock domains at the child instance(s), utilizing the process of FIG. 5 (block 424).

Following block 424, the process then proceeds to blocks 426 and 434, which illustrate determinations whether any CPC has not already been assigned a local clock domain (block 426) and whether any output or bidi port has not already been assigned a local clock domain (block 434). In response to an affirmative determination at block 426, the automated design tool processes each CPC that has not already been assigned in turn in a loop including blocks 428, 430, and 432. At block 428, the automated design tool selects a first or next CPC to process (block 428) and makes a domain assignment for the CPC utilizing the process of FIG. 6 (block 430). The process of FIG. 6 will additionally map the local clock domain assigned to the CPC to the CPC's target global clock domain, and ensure that the local clock domain is itself assigned a local power domain, and that the local power domain is assigned a local ground domain. Following block 430, the automated design tool determines at block 432 whether or not all CPCs detected at block 426 have been processed. If not, the process returns to block 428, which has been described. If, however, all CPCs detected at block 426 have been processed through the process of FIG. 6, the process proceeds to block 434.

In response to a negative determination at block 434, the process passes to block 444, which is described below. If, however, an affirmative determination is made at block 434, the automated design tool processes each output/bidi port in turn in a loop including blocks 436, 438, 440, and 442. At block 436, the automated design tool selects a first or next output port or bidi port to process. The automated design tool determines at block 438 if the selected port has a phase expression referring to only one virtual clock, after eliminating invalid clocks in block 402. Such a phase expression indicates that the port can be assigned a local clock domain that can be mapped to the global clock domain corresponding to the single virtual clock without causing a false crossing. If a negative determination is made at block 438, the process passes directly to block 442, which is described below. If, however, an affirmative determination is made at block 438, the automated design tool makes a local clock domain assignment for the port utilizing the process of FIG. 6 (block 440). Following block 440, the automated design tool determines at block 442 whether or not all ports detected at block 434 have been processed. If not, the process returns to block 436, which has been described. If, however, all ports detected at block 434 have been processed through the process of FIG. 6, the process proceeds to block 444, where the process of FIG. 4 ends.

Figure 5:
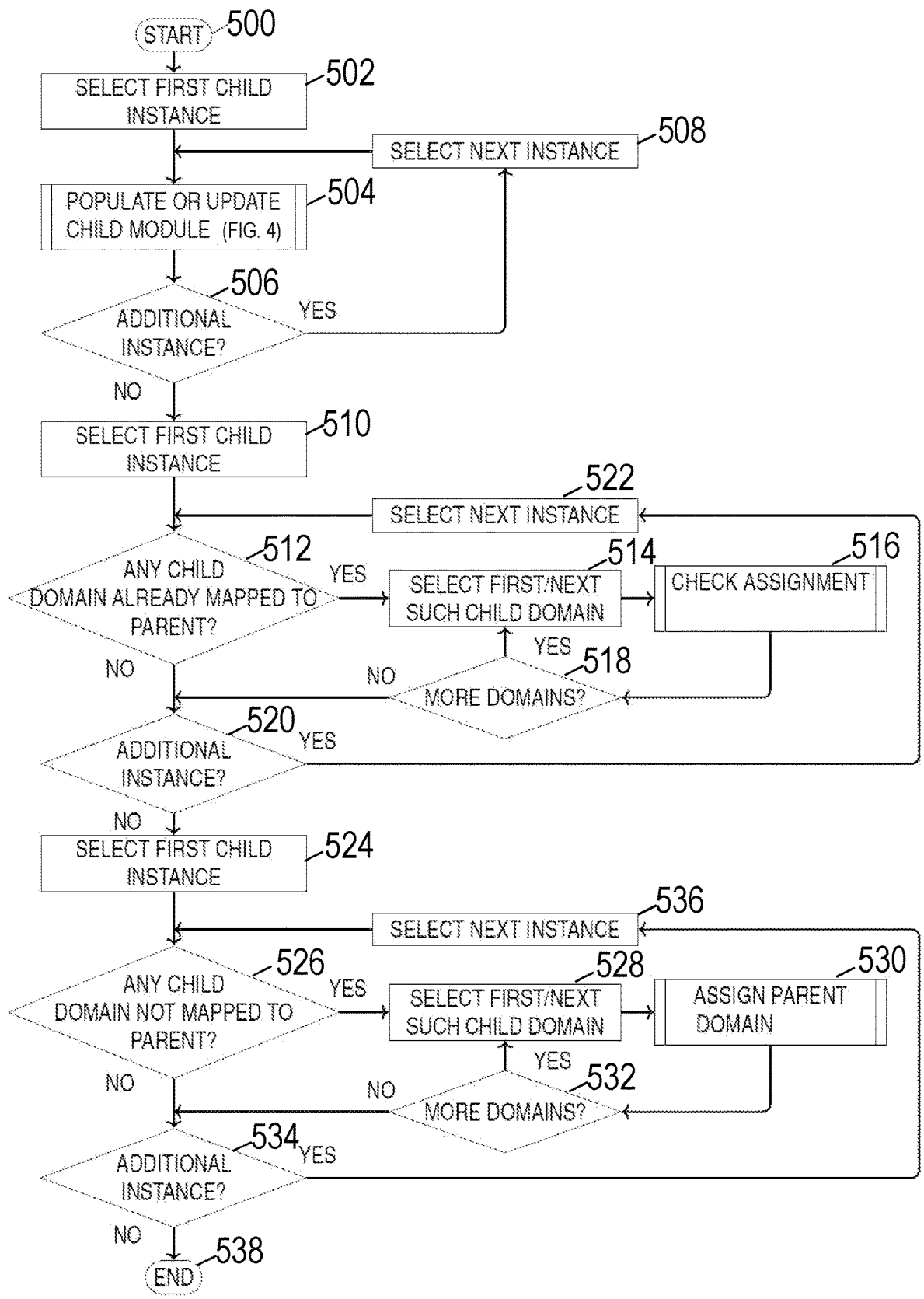
FIG. 5 is a high-level logical flowchart of an exemplary process for populating or updating child domains in accordance with one embodiment.

With reference now to FIG. 5, there is illustrated a high-level logical flowchart of an exemplary process for populating or updating child domains in accordance with one embodiment. The process of FIG. 5 begins at block 500 and then proceeds to blocks 502-508, which illustrates the automated design tool processing each child instance of the parent module instance by recursively calling the process of FIG. 4. In particular, the automated design tool selects a first child instance of the parent instance to process (block 502)

and recursively calls the process of FIG. 4 to populate or update the child module (block 504). If the automated design tool determines that any additional instances remain to be processed (block 506), the automated design tool selects a next child instance to process (block 508), and the process returns to block 504. In response to a negative determination at block 506, the process passes to block 510.

Blocks 510-520 depict the automated design tool processing each child instance of the parent module instance to check the domain assignment of each child local clock domain already mapped to (assigned) a parent local clock domain. Mappings from child local clock domains to parent local clock domains are made per parent module and not per instance. Therefore, it is possible that such a mapping was made when FIG. 5 was previously applied to a different instance of the parent module. In particular, at block 512, the automated design tool determines if any child local clock domain of the selected child module instance has already been mapped to a parent local clock domain. If not, the process passes to block 520, which is described below. If, however, an affirmative determination is made at block 512, the automated design tool selects a first or next child local clock domain to process (block 514) and invokes the subprocess of FIG. 6 to check the assignment of the child local clock domain (block 516). If the automated design tool determines that any additional child local clock domain remains to be processed (block 518), the process returns to block 514, which has been described. In response to a negative determination at block 518, the process passes to blocks 520-522, which illustrate the automated design tool selecting for processing a next unprocessed child instance, if any, of the currently selected parent module instance. The process then returns to block 512, which has been described.

Following the processing loop at blocks 510-520, the process of FIG. 5 proceeds to blocks 524-534, which depict the automated design tool processing each child instance of the parent module instance to make a domain assignment for each child local clock domain that has not already been mapped to (assigned) a parent local clock domain. In particular, at blocks 524-526, the automated design tool selects a first child instance of the parent module instance and determines if any child local clock domain of the selected child instance has already been mapped to a parent local clock domain. If not, the process passes to block 534, which is described below. If, however, an affirmative determination is made at block 526, the automated design tool selects a first or next child local clock domain to process (block 528) and invokes the subprocess of FIG. 6 to assign a parent local clock domain to the child local clock domain (block 530). If the automated design tool determines that any additional child local clock domains remain to be processed (block 532), the process returns to block 528, which has been described. In response to a negative determination at block 532, the process passes to block 534-536, which illustrate the automated design tool selecting for processing a next unprocessed child instance, if any, of the currently selected parent module instance. The process then returns to block 534, which has been described. If the automated design tool determines at block 534 that no additional child instance of the currently selected parent module instance remains to be processed, the process of FIG. 5 ends at block 538. For each child local clock domain mapped to a parent local clock domain by the process of FIG. 5, the child local power domain that is assigned to the child local clock domain will also be mapped to the parent local power domain that is assigned to the parent local clock domain; and the child local ground domain that is assigned to the child local power domain will also be mapped to the parent local ground domain that is assigned to the parent local power domain, by the processes of FIGS. 7-8, described below.

Figure 6:
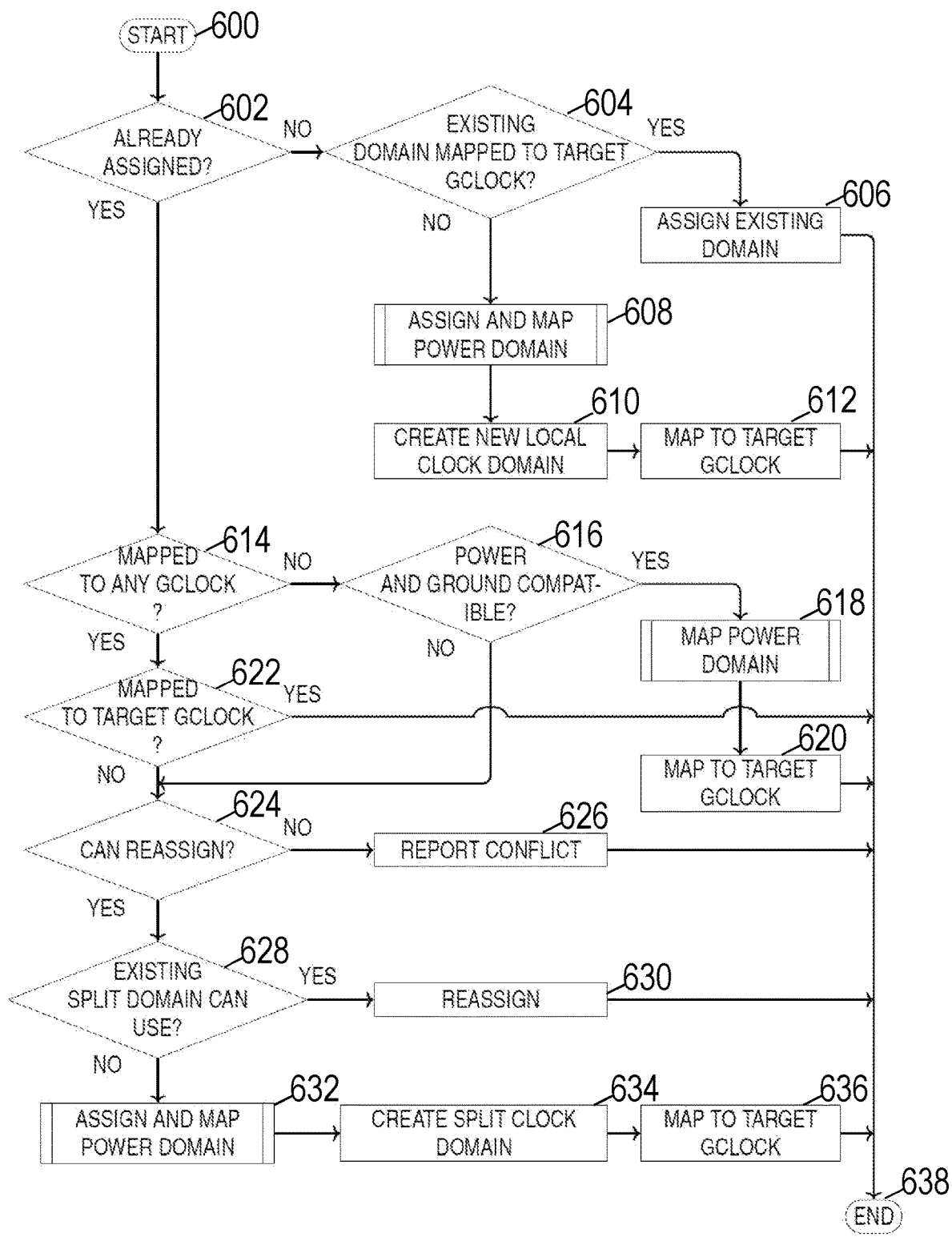
FIG. 6 is a high-level logical flowchart of an exemplary process for assigning or checking the assignment of clock domains in accordance with one embodiment.

Referring now to FIG. 6, there is depicted a high-level logical flowchart of an exemplary process for assigning a local clock domain or checking such an assignment in accordance with one embodiment. The process can be invoked, for example, at block 408, 418, 430 or 440 of FIG. 4, in which case the object being assigned is a CPC, output port, or bidi port. The process can also be invoked, for example, at block 516 or block 530 of FIG. 5, in which case the object being assigned is a child local clock domain. In this case, the assignment constitutes a mapping from the child local clock domain to a parent local clock domain. The process of FIG. 5 attempts to assign or check the assignment of a local clock domain with respect to a target global clock domain. If the object being assigned is a CPC, the target global clock domain is the global clock domain corresponding to the virtual clock referenced by the phase expression at the CPC's clock pin as determined in block 304 of FIG. 3. If the object being assigned is a port, the target global clock domain is the global clock domain corresponding to the virtual clock referenced by the phase expression at the port. If the object being assigned is a child local clock domain, the target global clock domain is the global clock domain to which the child local clock domain was mapped by the recursive call to FIG. 4 in block 504 of FIG. 5. Associated with the target global clock domain is a target global power domain and a target global ground domain. The target global power domain is the global power domain associated with the target global clock domain by the GDD table (see, e.g., Table I). The target global ground domain is the global ground domain associated with the target global power domain by the GDD table.

The process of FIG. 6 begins at block 600 and then proceeds to block 602, which illustrates the automated design tool determining whether or not the object being assigned (i.e., the CPC, port or child clock domain) has already been assigned a local (parent) clock domain. If so, the process proceeds to block 614, which is described below. If, however, a negative determination is made at block 602, the process proceeds to block 604, which illustrates the automated design tool determining whether or not any existing local clock domain is already mapped to the target global clock domain. If so, the automated design tool assigns one such local clock domain to the object being assigned (block 606). Thereafter, the process ends at block 638. If, however, the automated design tool determines at block 604 that no existing local clock domain is currently mapped to the target global clock domain, the automated design tool assigns and maps a local power domain, for example, by invoking the process shown in FIG. 7 (block 608). The resulting local power domain will be mapped (by the process of FIG. 7) to the target global power domain. In addition, the automated design tool creates a new local clock domain (block 610) and associates with (assigns to) that newly created local clock domain the local power domain identified in block 608. The automated design tool then maps the newly created local clock domain to the target global clock domain (block 612). Thereafter, the process of FIG. 6 ends at block 638.

Block 614 depicts the automated design tool determining whether or not the local clock domain currently assigned to the object being assigned (i.e., CPC, port or child clock domain) has already been mapped to any global clock domain. If so, the process passes to block 622, which is described below. If, however, a determination is made at block 614 that the currently assigned local clock domain has not been mapped to any global clock domain, the automated design tool additionally determines at block 616 whether or not the local power and ground domains associated with the currently assigned local clock domain are compatible with the target global clock domain in view of the specification provided in the GDD table (see, e.g., Table I). A local power domain is compatible if it has been mapped to the target global power domain or it has not yet been mapped to any global power domain. A local ground domain is compatible if it has been mapped to the target global ground domain or it has not yet been mapped to any global ground domain. If either of the local power domain or ground domain is determined to not be compatible with the target global clock domain, the process passes to block 624, which is described below. If, however, an affirmative determination is made at block 616, the automated design tool maps the local power domain to the target global power domain, if not already mapped, for example, by invoking the process of FIG. 7 (block 618). In addition, the automated design tool maps the currently assigned local clock domain to the target global clock domain (block 620). Thereafter, the process of FIG. 6 ends at block 638.

Referring now to block 622, the automated design tool determines whether or not the local clock domain currently assigned to the object being assigned (i.e., CPC, port or child local clock domain) is already mapped to the target global clock domain. If so, that mapping is retained, and the process ends at block 638. If, however, the automated design tool determines at block 622 that the currently assigned local clock domain is currently mapped to a global clock domain other than the target global clock domain, the automated design tool further determines at block 624 whether reassignment of the local clock domain to the object being assigned is permitted. A reassignment may not be permitted if, for example, the original assignment was made in accordance with a module-specific specification, or such reassignment was specifically disallowed by the user or designer. If a reassignment is not permitted, the automated design tool reports a conflict (block 626) to be resolved, for example, by the designer, and the process terminates at block 638.

If, however, the automated design tool determines at block 624 that reassignment of the local clock domain to the object being assigned is permitted, the process proceeds to blocks 628-636, which depict a subprocess in which the automated design tool either assigns an existing split local clock domain or creates a new split local clock domain to assign to the object being assigned. A split local clock domain is one created at block 634, described below. This subprocess is employed if a local clock domain cannot be mapped to a single global clock domain at all instances. At block 628, the automated design tool determines whether or not an existing split local clock domain is currently mapped to the target global clock domain. If so, the automated design tool reassigns to the object being assigned the existing split local clock domain (block 630), and the process of FIG. 6 ends at block 638. If, however, no existing split local clock domain is mapped to the target global clock domain, the automated design tool assigns and maps a local power domain to the target global power domain in accordance with the input specification utilizing the process of FIG. 7 (block 632). In addition, the automated design tool creates a new split local clock domain in the current module, assigns to the newly created split local clock domain the local power domain identified at block 632, and records an association between the previously assigned local clock domain and the newly created split local clock domain (block 634). The previously assigned local clock domain is said to be the "origin" of the newly created split local clock domain. The newly created split local clock domain is said to be "split from" the previously assigned local clock domain. The automated design tool then reassigns to the object being assigned the newly created split local clock domain and maps the newly created split local clock domain to the target global clock domain (block 636). Thereafter, the process of FIG. 6 ends at block 638. It should be noted that in order for an existing split local clock domain to be reassigned to the object being assigned at block 630, the existing split local clock domain must (1) have been created at block 634 during a previous invocation of the process of FIG. 6 for a different object (CPC, port or child clock domain) within the same module instance and (2) be directly or indirectly split from the local clock domain previously assigned to the object being assigned.

Figure 7:
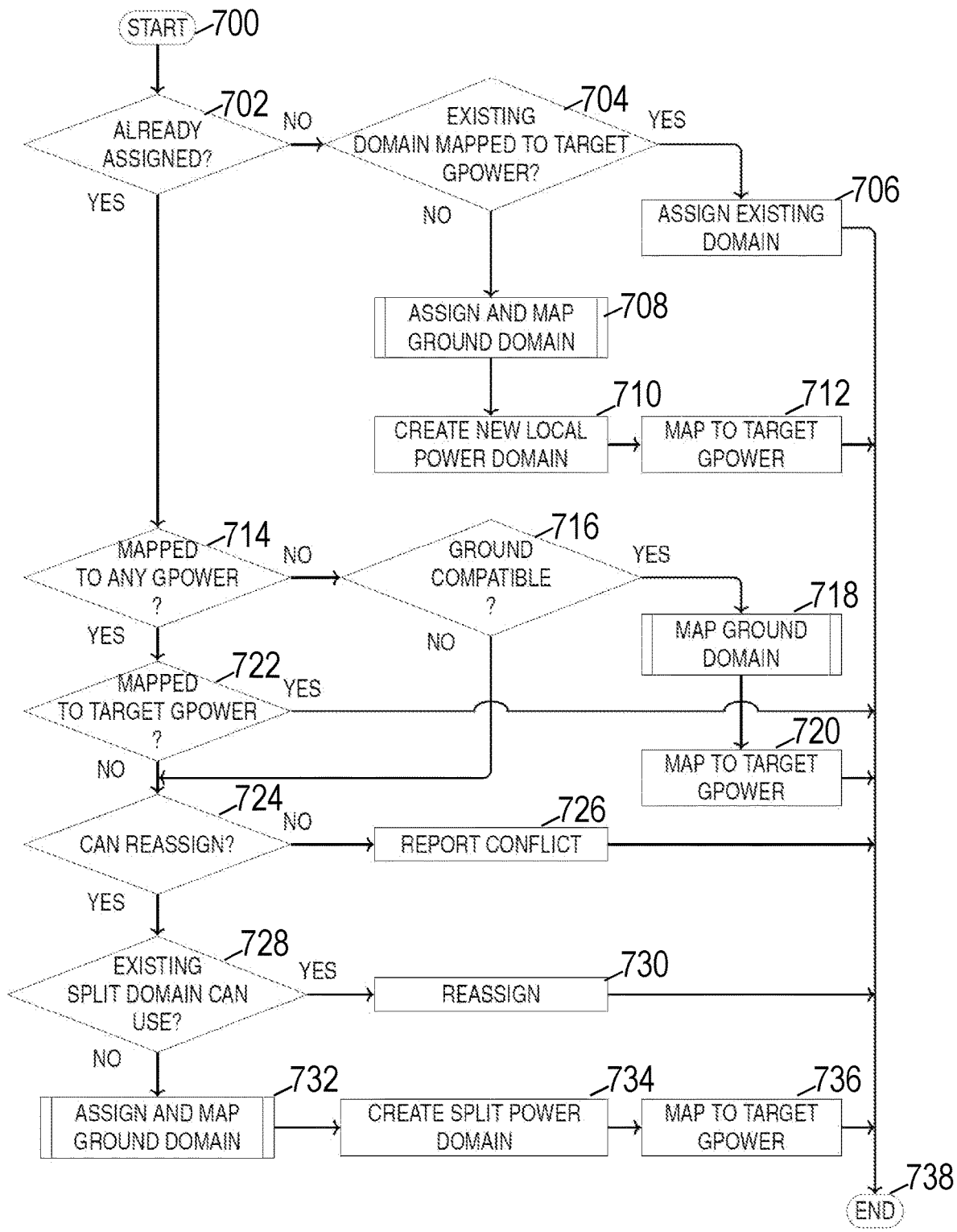
FIG. 7 is a high-level logical flowchart of an exemplary process for assigning or checking the assignment of power domains in accordance with one embodiment.

With reference now to FIG. 7, there is illustrated a high-level logical flowchart of an exemplary process for assigning a local power domain or checking such an assignment in accordance with one embodiment. In the described embodiment, every local clock domain must be assigned a local power domain, that is, the automated design tool must determine an N-to-1 mapping from local clock domains to local power domains. The process can be invoked, for example, at one of blocks 608, 618, and 632 of FIG. 6. In each case, the objective of the process of FIG. 7 is to create, if necessary, and assign one local power domain to the local clock domain which is being assigned or whose assignment is being checked by FIG. 6. The process of FIG. 7 attempts to assign or check the assignment of a local power domain with respect to a target global power domain. The target global power domain is the global power domain associated by the GDD table (e.g., see Table I) with the target global clock domain determined by the process of FIG. 6. Associated with the target global power domain is a target global ground domain. The target global ground domain is the global ground domain associated by the GDD table with the target global power domain.

The process of FIG. 7 begins at block 700 and then proceeds to block 702, which illustrates the automated design tool determining whether or not the local clock domain (i.e., the one being assigned or whose assignment is being checked at block 608, 618 or 632 of FIG. 6) has already been assigned a local power domain. If the process of FIG. 7 is being called from the process of FIG. 6 when assigning or checking the assignment of a child local clock domain, then at block 702 the automated design tool determines whether the child local power domain assigned to the child local clock domain has already been mapped to (assigned) a parent local power domain. If so, the process proceeds to block 714, which is described below. If, however, a negative determination is made at block 702, the process proceeds to block 704, which illustrates the automated design tool determining whether or not any existing local power domain is currently mapped to the target global power domain. If so, the automated design tool assigns one such local power domain to the local clock domain being assigned (block 706). Thereafter, the process ends at block 738. If, however, the automated design tool determines at block 704 that no existing local power domain is currently mapped to the target global power domain, the automated design tool assigns and maps a local ground domain, for example, by invoking the process of FIG. 8 (block 708). The resulting local ground domain will be mapped (by the process of FIG. 8) to the target global ground domain. In addition, the automated design tool creates a new local power domain (block 710) and associates with (assigns to) that newly created local power domain the local ground domain identified in block 708. The automated design tool then maps that newly created local power domain to the target global power domain (block 712). Thereafter, the process of FIG. 7 ends at block 738.

Block 714 depicts the automated design tool determining whether or not the local power domain that is currently assigned to the local clock domain being assigned has been mapped to any global power domain. If so, the process passes to block 722, which is described below. If, however, a determination is made at block 714 that the currently assigned local power domain has not been mapped to any global power domain, the automated design tool additionally determines at block 716 whether or not the local ground domain associated with the currently assigned local power domain is compatible with the target global power domain in view of the specification provided in the GDD table (see, e.g., Table I). A local ground domain is compatible if it has been mapped to the target global ground domain or it has not yet been mapped to any global ground domain. If the local ground domain is determined to not be compatible, the process passes to block 724, which is described below. If, however, an affirmative determination is made at block 716, the automated design tool maps the local ground domain to the target global ground domain, if not already mapped, for example, by invoking the process of FIG. 8 (block 718). In addition, the automated design tool maps the currently assigned local power domain to the target global power domain in accordance with the input specification (block 720). Thereafter, the process of FIG. 7 ends at block 738.

Referring now to block 722, the automated design tool determines whether or not the global power domain to which the local power domain is currently mapped is the target global power domain. If so, that mapping is retained, and the process ends at block 738. If, however, the automated design tool determines at block 722 that the global power domain to which the local power domain is currently mapped is not the target global power domain, the automated design tool further determines at block 724 whether reassignment of the local power domain is permitted. A reassignment may not be permitted if, for example, the original assignment was made in accordance with a module-specific specification, or such reassignment was specifically disallowed by the user or designer. A reassignment may also not be permitted if the local clock domain being assigned is not a newly created local clock domain (i.e., newly created by the process of FIG. 6). If a reassignment is not permitted, the automated design tool reports a conflict (block 726) to be resolved, for example, by the designer, and the process terminates at block 738.

If, however, the automated design tool determines at block 724 that reassignment of the local power domain to the local clock domain being assigned is permitted, the process proceeds to blocks 728-736, which depict a subprocess in which the automated design tool either assigns an existing split local power domain or creates a new split local power domain to assign to the local clock domain being assigned. A split local power domain is one created at block 734, described below. This subprocess is employed if a local power domain cannot be mapped to a single global power domain at all instances. At block 728, the automated design tool determines whether or not an existing split local power domain is currently mapped to the target global power domain. If so, the automated design tool reassigns to the local clock domain being assigned the existing split local power domain (block 730), and the process of FIG. 7 ends at block 738. If, however, no existing split local power domain is mapped to the target global power domain, the automated design tool assigns and maps a local ground domain to the target global ground domain, for example, by invoking the process of FIG. 8 (block 732). In addition, the automated design tool creates a new split local power domain in the current module, assigns to the newly created split local power domain the local ground domain identified in block 732, and records an association between the previously assigned local power domain and the newly created split local power domain (block 734). The previously assigned local power domain is said to be the "origin" of the newly created split local power domain. The newly created split local power domain is said to be "split from" the previously assigned local power domain. The automated design tool then reassigns to the local clock domain being assigned the newly created split local power domain and maps the newly created split power domain to the target global power domain (block 736). Thereafter, the process of FIG. 7 ends at block 738. It should be noted that in order for an existing split local power domain to be reassigned to the local clock domain being assigned at block 730, the existing split local power domain must (1) have been created at block 734 during a previous invocation of the process of FIG. 7 for a different local clock domain within the same module instance and (2) be directly or indirectly split from the local power domain previously assigned to the local clock domain being assigned.

Figure 8:
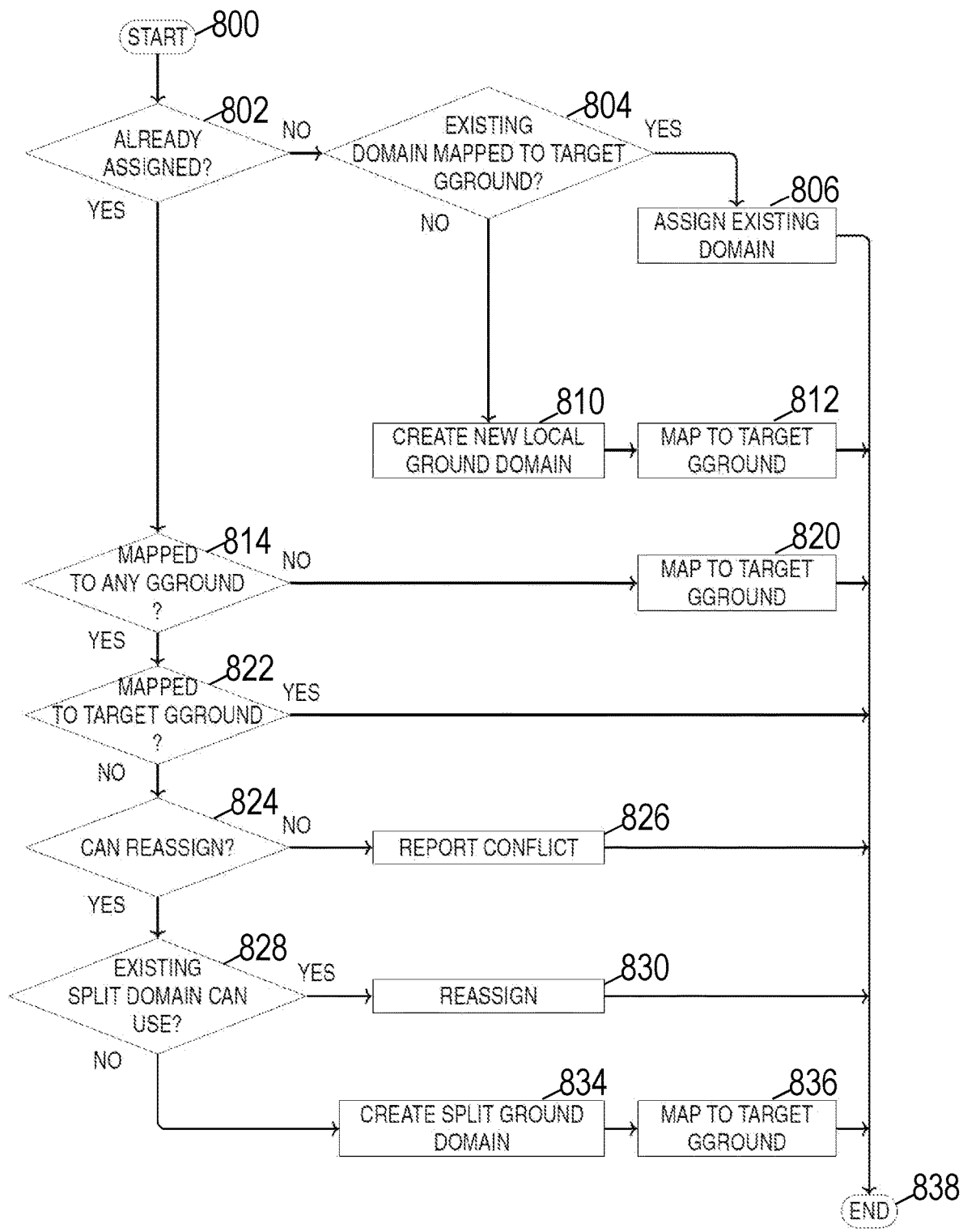
FIG. 8 is a high-level logical flowchart of an exemplary process for assigning or checking the assignment of ground domains in accordance with one embodiment.

With reference now to FIG. 8, there is illustrated a high-level logical flowchart of an exemplary process for assigning a local ground domain or checking such an assignment in accordance with one embodiment. In the described embodiment, every local power domain must be assigned a local ground domain, that is, the automated design tool must determine an N-to-1 mapping from local power domains to local ground domains. The process can be invoked, for example, at one of blocks 708, 718, and 732 of FIG. 7. In each case, the objective of the process of FIG. 8 is to create, if necessary, and assign one local ground domain to the local power domain which is being assigned or whose assignment is being checked by FIG. 7. The process of FIG. 8 attempts to assign or check the assignment of a local ground domain with respect to a target global ground domain. The target global ground domain is the global ground domain associated by the GDD table (e.g., see Table I) with the target global power domain determined by the process of FIG. 7.

The process of FIG. 8 begins at block 800 and then proceeds to block 802, which illustrates the automated design tool determining whether or not the local power domain (i.e., the one being assigned or whose assignment is being checked at block 708, 718 or 732 of FIG. 7) has already been assigned a local ground domain. If the process of FIG. 8 is being called from the process of FIG. 7 when assigning or checking the assignment of a child local power domain, then at block 802 the automated design tool determines whether the child local ground domain assigned to the child local power domain has already been mapped to (assigned) a parent local ground domain. If so, the process proceeds to block 814, which is described below. If, however, a negative determination is made at block 802, the process proceeds to block 804, which illustrates the automated design tool determining whether or not any existing local ground domain is currently mapped to the target global ground domain. If so, the automated design tool assigns one such local ground domain to the local power domain being assigned (block 806). Thereafter, the process ends at block 838. If, however, the automated design tool determines at block 804 that no existing local ground domain is currently mapped to the target global ground domain, the automated design tool creates a new local ground domain (block 810) and maps that newly created local ground domain to the target global ground domain (block 812). Thereafter, the process of FIG. 8 ends at block 838.

Block 814 depicts the automated design tool determining whether or not the local ground domain that is currently assigned to the local power domain being assigned has been mapped to any global ground domain. If so, the process passes to block 822, which is described below. If, however, a determination is made at block 814 that the currently assigned local ground domain has not been mapped to any global ground domain, the automated design tool maps the currently assigned local ground domain to the target global ground domain (block 820). Thereafter, the process of FIG. 8 ends at block 838.

Referring now to block 822, the automated design tool determines whether or not the global ground domain to which the local ground domain is currently mapped is the target global ground domain in view of the input specification. If so, that mapping is retained, and the process ends at block 838. If, however, the automated design tool determines at block 822 that the global ground domain to which the local ground domain is currently mapped is not the target global ground domain, the automated design tool further determines at block 824 whether reassignment of the local ground domain is permitted. A reassignment may not be permitted if, for example, the original assignment was made in accordance with a module-specific specification, or such reassignment was specifically disallowed by the user or designer. A reassignment may also not be permitted if the local power domain being assigned is not a newly created local power domain (i.e., newly created by the process of FIG. 7). If a reassignment is not permitted, the automated design tool reports a conflict (block 826) to be resolved, for example, by the designer, and the process terminates at block 838.

If, however, the automated design tool determines at block 824 that reassignment of the local ground domain to the local power domain being assigned is permitted, the process proceeds to blocks 828-836, which depict a subprocess in which the automated design tool either assigns an existing split local ground domain or creates a new split local ground domain to assign to the local power domain being assigned. A split local ground domain is one created at block 834, described below. This subprocess is employed if a local ground domain cannot be mapped to a single global ground domain at all instances. At block 828, the automated design tool determines whether or not an existing split local ground domain is currently mapped to the target global ground domain. If so, the automated design tool reassigns to the local power domain being assigned the existing split local ground domain (block 830), and the process of FIG. 8 ends at block 838. If, however, no existing split local ground domain is mapped to the target global ground domain, the automated design tool creates a new split local ground domain in the current module and records an association between the previously assigned local ground domain and the newly created split local ground domain (block 834). The previously assigned local ground domain is said to be the "origin" of the newly created split local ground domain. The newly created split local ground domain is said to be "split from" the previously assigned local ground domain. The automated design tool then reassigns to the local power domain being assigned the newly created split local ground domain and maps the newly created split ground domain to the target global ground domain (block 836). Thereafter, the process of FIG. 8 ends at block 838. It should be noted that in order for an existing split local ground domain to be reassigned to the local power domain being assigned at block 830, the existing split local ground domain must (1) have been created at block 834 during a previous invocation of the process of FIG. 8 for a different local power domain within the same module instance and (2) be directly or indirectly split from the local ground domain previously assigned to the local power domain being assigned.

Figure 9:
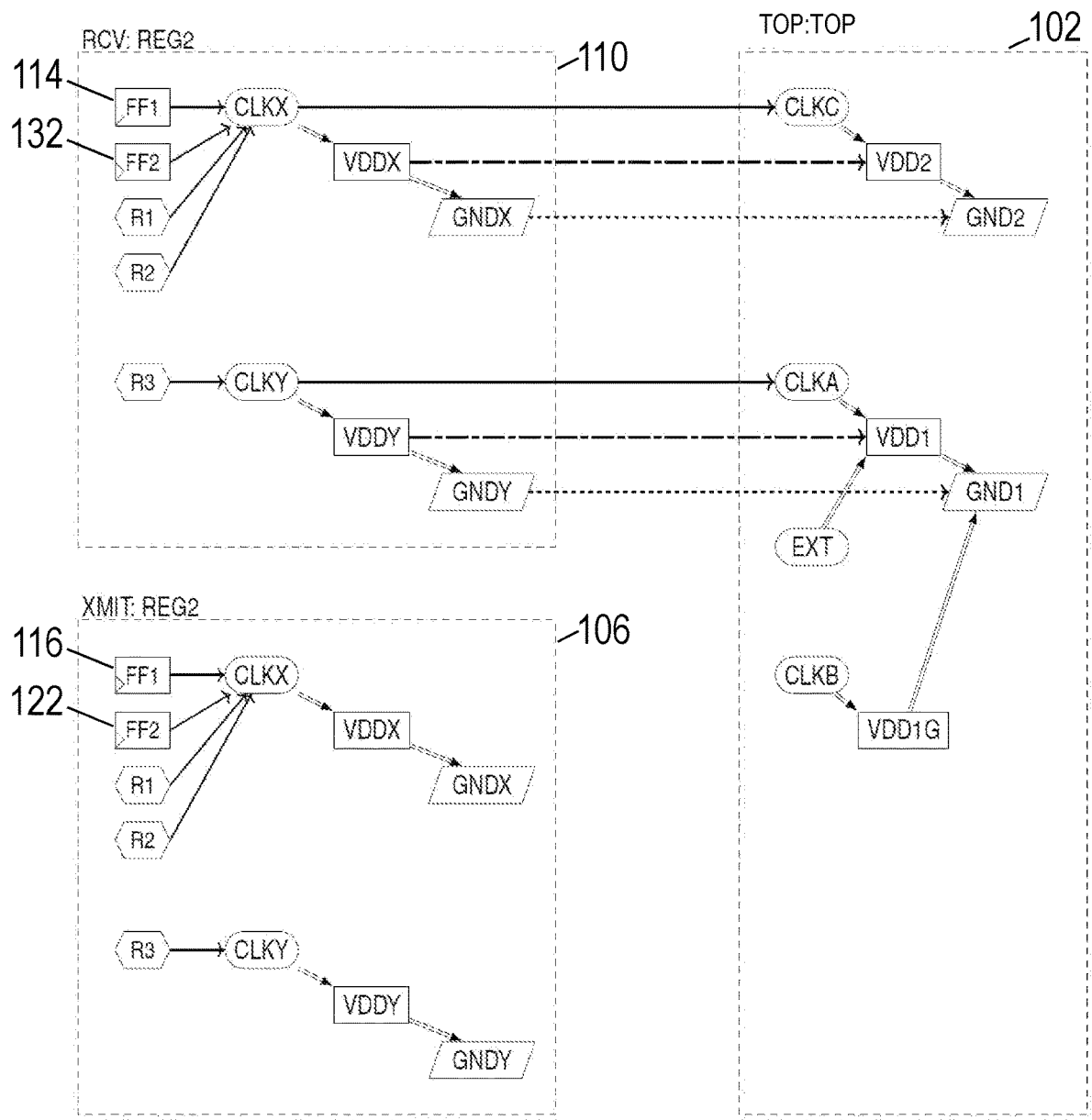
FIG. 9 illustrates an exemplary domain mapping for a first instance of a particular module in the modular circuit design of FIG. 1.
Figure 10:
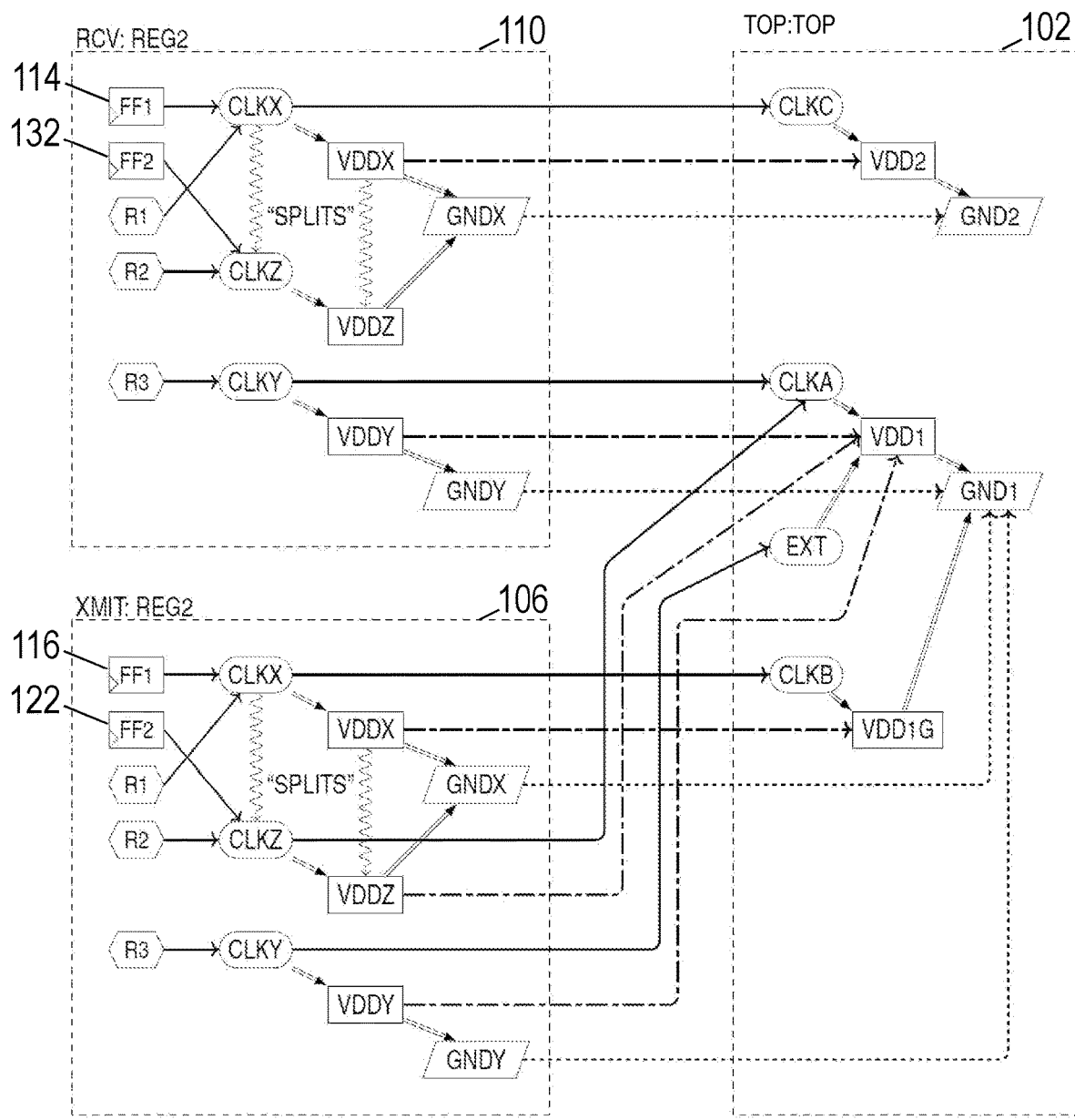
FIG. 10 illustrates an exemplary domain mapping for a second instance of a particular module in the modular circuit design of FIG. 1.

With reference now to FIGS. 9-10, exemplary clock, power, and ground domain mappings generated for first and second instances (RCV:REG2 and XMIT:REG2), respectively, of a particular module (e.g., REG2) in the modular circuit design of FIG. 1 are illustrated. In particular, FIG. 9 depicts an example assignment and mapping for the instances of module REG2 as the assignment and mapping may exist after the automated design tool has visited instance 110 (i.e., RCV:REG2), but before the automated design tool has visited instance 106 (i.e., XMIT:REG2), during the process of block 306 of FIG. 3. It will be appreciated that, in practice, the order in which the child instances of a module are processed in the depth-first traversal can be arbitrary and may be determined, for example, in alphabetical order by instance name.

At instance 110, the automated design tool determines from the phase expressions propagated at block 304 of FIG. 3 that flip-flop FF1 114 and flip-flop FF2 132 and output ports R1 and R2 are all associated with target global clock domain CLKC. The phase expression associated with output port R3 is "A@L^B@L^EXT@L", which refers to global clock domains CLKA, CLKB, and EXT. However, assigning output port R3 to domains CLKB or EXT would potentially cause illegal false crossings based on the constraints specified by the exemplary input specification set forth above in Table II. Therefore, the automated design tool associates output port R3 with target global clock domain CLKA. For each flip-flop and output port, the automated design tool invokes the process of FIG. 6, which creates two local clock domains, named CLKX and CLKY, and maps them to global clocks CLKC and CLKA, respectively. The process of FIG. 6 in turn calls the process of FIG. 7, which creates two local power domains, VDDX and VDDY, assigned to local clock domains CLKX and CLKY, respectively, and mapped to global power domains VDD2 and VDD1, respectively. The process of FIG. 7 in turn calls the process of FIG. 8, which creates two local ground domains, GNDX and GNDY, assigned to local power domains VDDX and VDDY, respectively, and mapped to global ground domains GND2 and GND1, respectively. In this example, local domain names within module REG2 have been deliberately chosen to be different from the global domain names to emphasize that the local domain names and global domain names are independent and that any relationship between a local domain and a global domain is determined by the mapping established by the processes shown in FIGS. 6-8 and not based on domain name. In practice, it can be useful to name local domains based on the corresponding global domains, where possible, to aid in debugging the modular circuit design. It should be noted that the assignment of local clock domains to flip-flops and ports, the assignment of local power domains to local clock domains, and the assignment of local ground domains to local power domains, are all made and recorded per module and not per instance. Therefore, FIG. 9 illustrates that such assignments are necessarily identical for both instances (106 and 110) of module REG2 even though the automated design tool has not yet visited instance 106. The mappings from local domains to global domains, by contrast, are made per instance (not per module), and therefore appear only for instance 110 in FIG. 9.

FIG. 10 depicts the assignments and mappings between local and global clock, power, and ground domains that can be obtained based on the automated design tool visiting instance 106 (i.e., XMIT:REG2) during its depth-first traversal of the instance hierarchy. In this case, because the flip-flops and output ports are already assigned to local clock domains based on the processing of instance 110, the automated design tool first attempts to map the existing local domains to the global domains specific to instance 106. For example, the automated design tool maps local clock domain CLKX to target global clock domain CLKB based on how flip-flop FF1 116 is clocked at instance 106, by invoking the process of FIG. 6. The automated design tool in turn maps local power domain VDDX to target global power domain VDD1G in the process of FIG. 7 and maps local ground domain GNDX to target global power domain GND1 in the process of FIG. 8.

However, this preliminary mapping creates a problem for flip-flop FF2 122, which was also initially assigned to local clock domain CLKX (as shown in FIG. 9), but is not clocked by global clock domain CLKB at instance 106. Instead, flip-flop FF2 122 is clocked by clock domain CLKA, as reflected by the phase expression propagating to the clock pin of flip-flop FF2 122 in FIG. 1. Consequently, during the processing depicted at block 634, the automated design tool "splits" local clock domain CLKX, creating a new split local clock domain CLKZ. Flip-flop FF2 122 is thus reassigned new local clock domain CLKZ, which is in turned mapped to global clock domain CLKA at block 636. The automated design tool also similarly splits the associated power domain VDDX, creating a new split local power domain VDDZ by the processing shown at block 734. Local power domain VDDZ is then mapped to global power domain VDD1 at block 736. The automated design tool later reassigns to port R2 local clock domain CLKZ, for example, in the processing depicted at block 630 of FIG. 6.

In at least some embodiments, the automated design tool only visits each module instance once during the instance tree traversal represented by block 306 of FIG. 3, meaning the mappings previously established for instance 110 are not updated after the visit to instance 106. As a result, the new split clock and power domains are not explicitly mapped for instance 110. However, for each domain that is split, the automated design tool preferably records an indication from which origin domain the new local domain is split. In FIG. 10, this association is represented by a wavy arrow directed from the origin domain to the newly created split domain. (A split domain can itself later be split, in which case it can serve as the origin domain for the newer split domain.) If a split domain is not explicitly mapped for a given instance, the split domain is nevertheless implicitly mapped to the same higher-level domain as its associated origin domain. For example, local clock domain CLKZ is implicitly mapped to top-level clock domain CLKC at instance 110 because the associated origin domain CLKX is mapped to CLKC at instance 110. Therefore, the mappings established by the visit to instance 110 are preserved despite the addition of local domains and reassignments made during the visit to instance 106.

It should be noted that once the automated design tool maps local domains to global domains at a given child module instance, the automated design tool will employ this mapping to in turn assign the child's local domains to the parent's local domains in the parent module instance, for example, by the process of blocks 510-536 of FIG. 5. In this manner, domains are mapped up the instance hierarchy. The global mappings determined at each instance are only stored temporarily to enable the local child-to-parent mapping. Therefore, in addition to illustrating the local-to-global mappings, FIG. 10 also illustrates the child-to-parent mappings from instances 110 and 106 of module REG2 to instance 102 of module TOP. In this example, the names of the local clock, power and ground domains of module TOP coincide with the global clock, power, and ground names. It is typical but not required for the local domains of the top-level module to have names matching the global domains.

Each local power and ground domain in each module will correspond to a power and ground wire, or "rail," in the modified modular circuit design. FIG. 2B illustrates that the automated design tool has added to module REG2 power rails VDDX, VDDY and VDDZ and ground rails GNDX and GNDY. Each child-to-parent domain mapping will correspond to a cross-hierarchy rail connection in the modified modular circuit design. FIG. 2A illustrates that the automated design tool has connected the VDDX, VDDY, and VDDZ rails of module REG2 to module TOP rails VDD1G, VDD1 and VDD1, respectively, at instance 106 and to module TOP rails VDD2, VDD1 and VDD2, respectively, at instance 110, consistent with the corresponding domain mappings shown in FIG. 10.

Referring again to FIG. 3, following the processing performed at block 306, the process proceeds to block 308. Block 308 illustrates the automated design tool preparing to create crossing specifications for each module that refer only to the module's local clock domains (created in block 306) instead of global domains. To prepare to create the crossing specifications, the automated design tool creates crossing specifications for the top-level module (e.g., TOP). These top-level module crossing specifications are essentially a copy of the global domain crossing constraints specified in the GDCC table (see, e.g., Table II) because the modular circuit design includes only one instance 102 of the top-level module (i.e., TOP:TOP), and generally, there is a one-to-one correspondence between top-level local domains and global domains.

Figure 11:
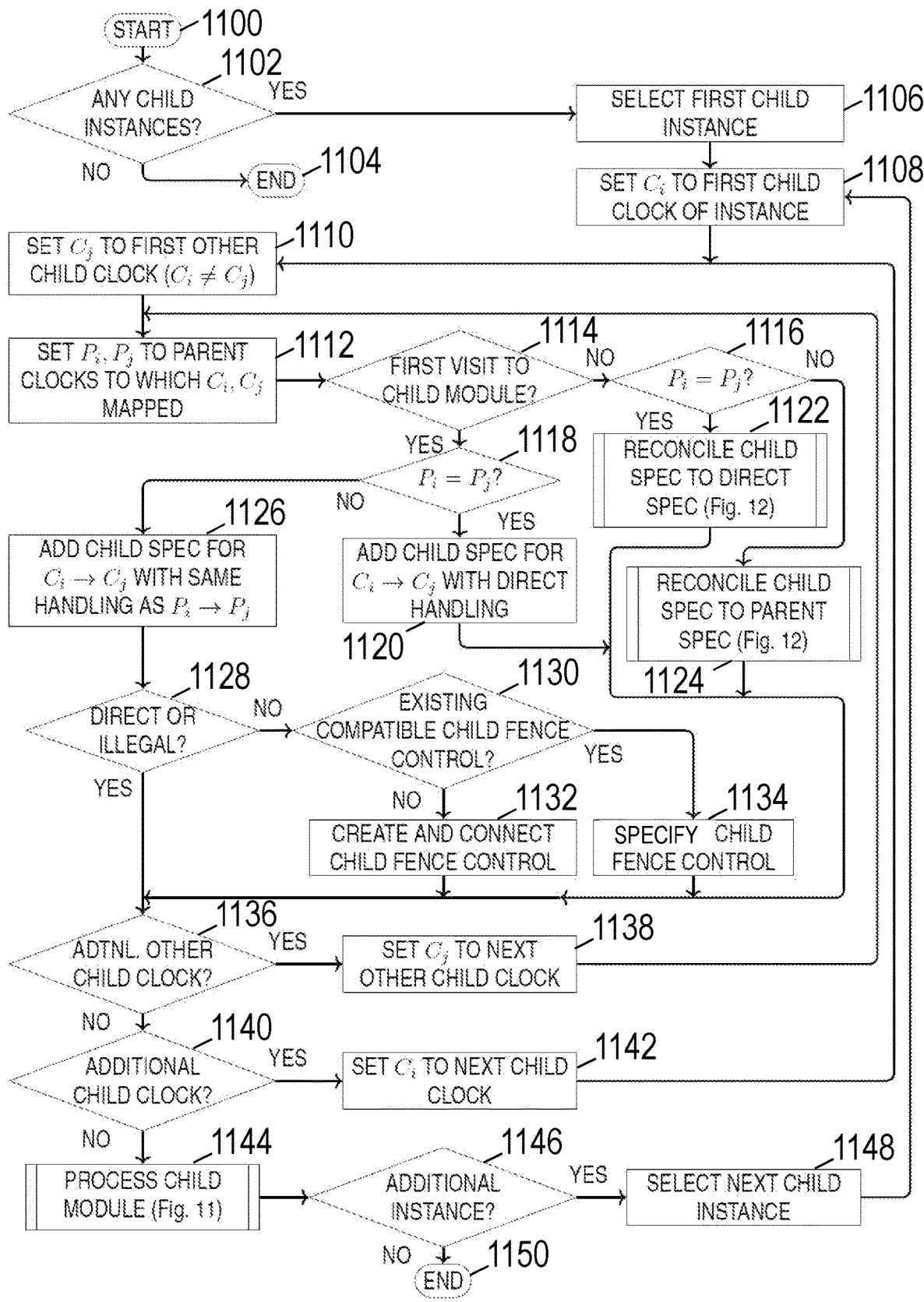
FIG. 11 is a high-level logical flowchart of an exemplary process for pushing specifications down a hierarchy of a modular circuit design in accordance with one embodiment.
Figure 12:
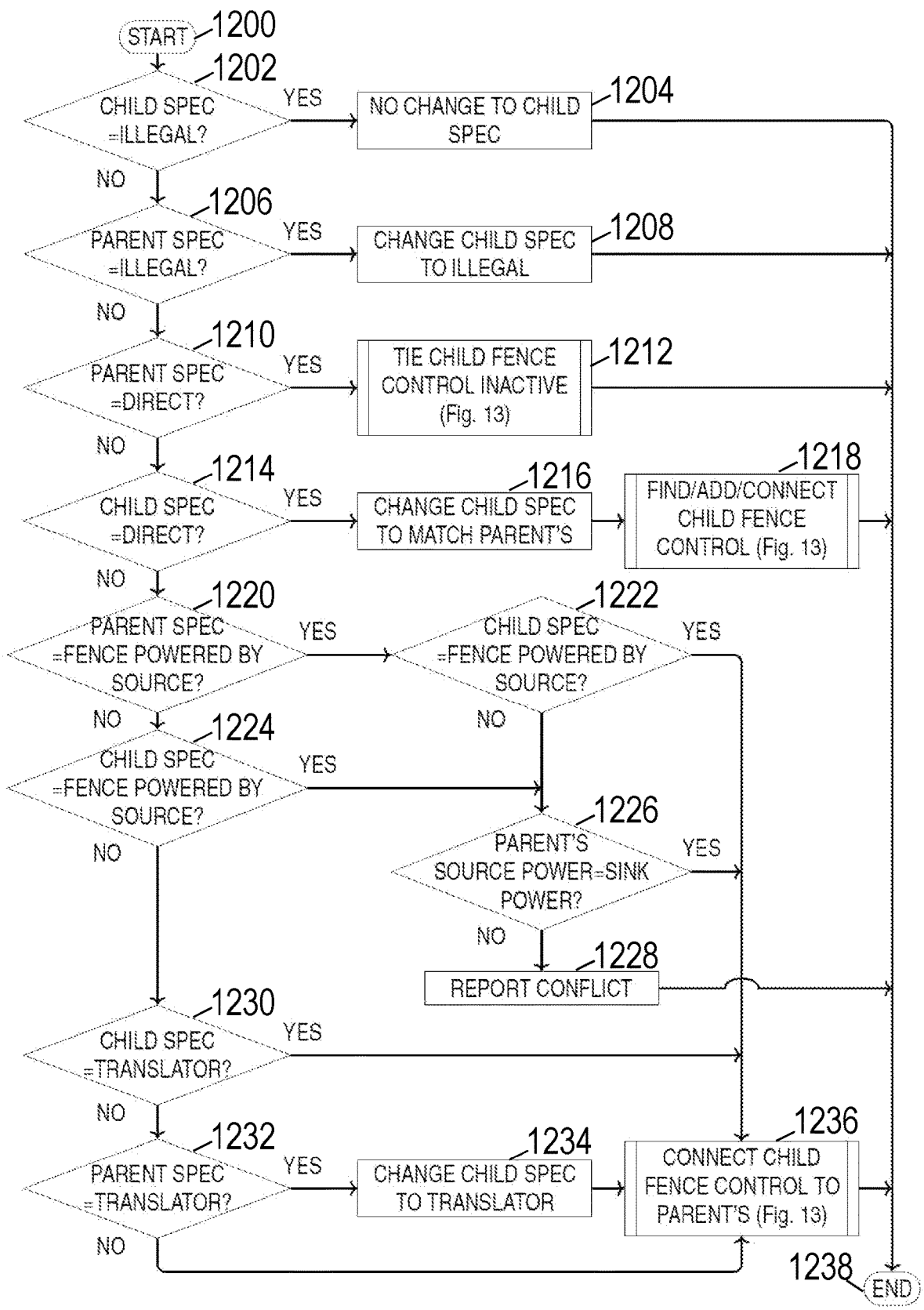
FIG. 12 is a high-level logical flowchart of an exemplary process for reconciling specifications of a child module against a parent module in accordance with one embodiment.
Figure 13:
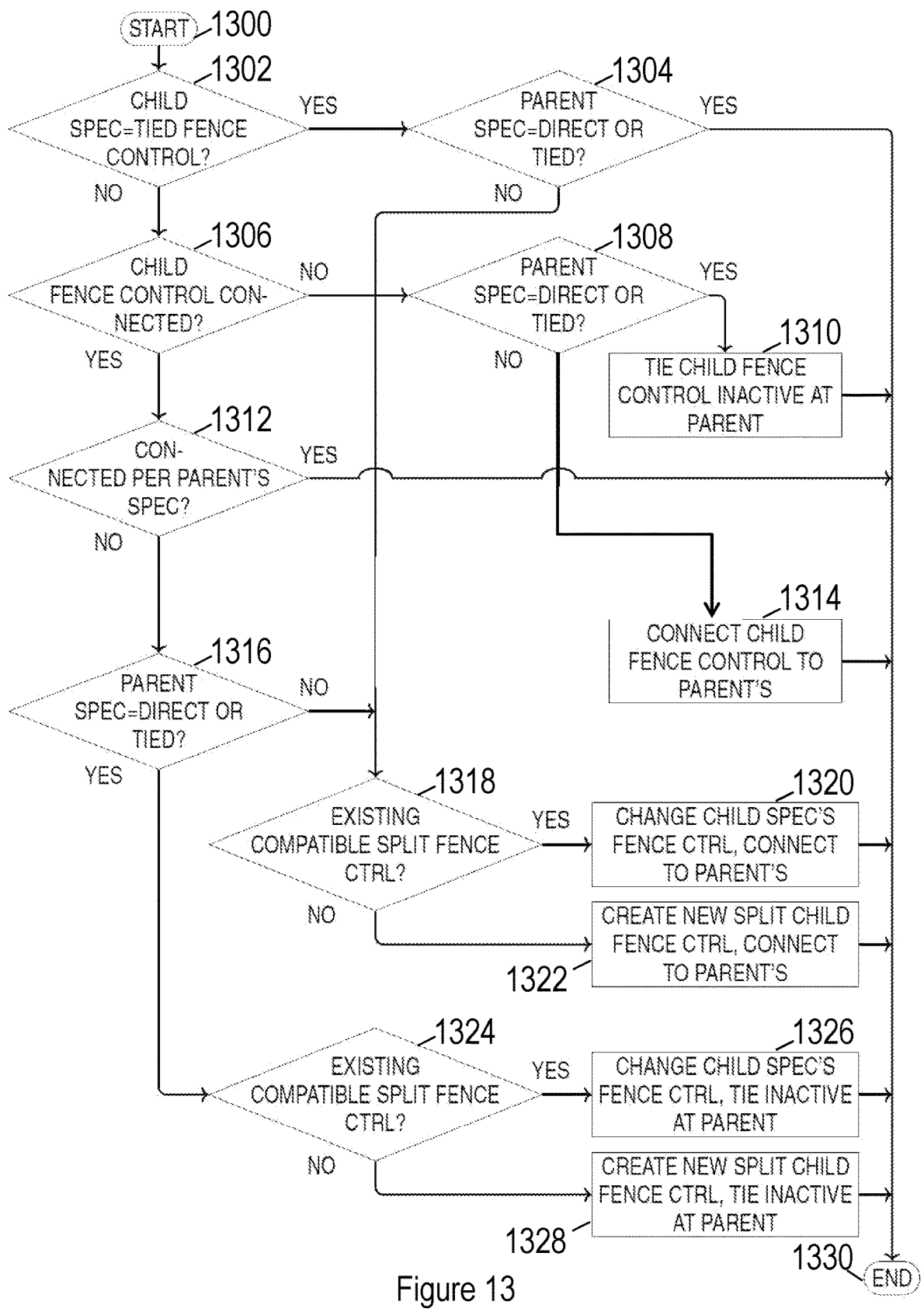
FIG. 13 is a high-level logical flowchart of an exemplary process for locating and connecting fence controls in a child module in accordance with one embodiment.

At block 310, the automated design tool "pushes" domain crossing specifications down the instance hierarchy by a subprocess detailed in FIGS. 11, 12, and 13. In at least some embodiments, this process includes another depth-first traversal of the instance tree. At each instance, the automated design tool creates or modifies the specifications of each child module based on the mapping of domains from child-to-parent at that instance and the specifications of the parent module. The automated design tool then recursively processes the child instance, further pushing the specifications down. During this process, the automated design tool will add local fence control signals as needed to each module, and map them up the hierarchy, in a manner similar to the mapping of local domains by the process of block 306.

With reference now specifically to FIG. 11, there is illustrated a high-level logical flowchart of an exemplary process for pushing specifications down an instance hierarchy of a modular circuit design in accordance with one embodiment. The process of FIG. 11 begins at block 1100 and then proceeds to block 1102, which illustrates the automated design tool determining whether or not a given instance (e.g., TOP:TOP instance 102) in the instance hierarchy has any child instances. If not, the process of FIG. 11 simply terminates at block 1104. If, however, the automated design tool determines the given instance in the instance hierarchy has at least one child instance, the process proceeds to block 1106, which illustrates the automated design tool selecting a first child instance to process. The process then passes to block 1108.

Block 1108 depicts the automated design tool setting a first variable $C_i$ to a first child local clock domain of the presently selected instance. The process then proceeds to block 1110, which illustrates the automated design tool setting a second variable $C_j$ to a different child local clock domain of the presently selected instance. At block 1112, the automated design tool additionally sets variables $P_i$ and $P_j$ to the parent local clock domains to which $C_i$ and $C_j$ are mapped.

The process proceeds from block 1112 to block 1114, which illustrates the automated design tool determining whether or not the presently selected child instance is the first instance of the child module that has been visited during the traversal of the instance hierarchy at block 310 of FIG. 3. If not, the process passes to block 1116, which is described below. If, however, an affirmative determination is made at block 1114, the automated design tool determines at block 1118 whether or not variables $P_i$ and $P_j$ represent the same parent local clock domain. If so, the automated design tool adds a child specification for signals crossing from the clock domain associated with $C_1$ to the clock domain associated with $C_j$ utilizing direct handling (i.e., no crossing constraint). The process then passes to block 1136, which is described below. If, however, automated design tool makes a negative determination at block 1118, the automated design tool adds a child specification for signals crossing from the clock domain associated with $C_i$ to the clock domain associated with $C_j$ utilizing the same handling type as utilized by the parent specification for crossings from clock domain $P_i$ to clock domain $P_j$. As indicated by decision block 1128, if the parent specification's handling type is direct or illegal, or if the handling type is TRANS but with a tied fence control, the process then passes directly to block 1136. If, however, the handling type is other than direct or illegal (e.g., is TRANS, FENCE-IN, or FENCE-OUT) and a fence control signal is specified, the automated design tool additionally determines at block 1130 whether or not an existing child fence control signal is present that is compatible with the parent's specification. An existing child fence control signal is compatible if it has already been mapped to the parent fence control signal referenced by the parent's crossing specification. If so, the automated design tool specifies the existing child fence control signal for the newly added child specification for crossings from $C_i$ to Cj (block 1134). If, however, the automated design tool determines at block 1130 that no existing child fence control signal is present that is compatible with the parent's specification, the automated design tool creates the needed child fence control signal, maps ("connects") the child fence control signal to the parent's specified fence control signal, and specifies the use of the newly added child fence control signal for crossings from $C_i$ to Cj (block 1132). Following either block 1132 or block 1134, the process passes to block 1136.

Block 1116 illustrates the automated design tool determining whether or not variables $P_i$ and $P_j$ represent the same parent local clock domain. If so, the automated design tool invokes execution of the process depicted in FIG. 12 at block 1122 in order to reconcile the child specification to a direct-handling specification. Otherwise, the automated design tool invokes execution of the process depicted in FIG. 12 at block 1124 in order to reconcile the child specification to the parent specification. Following either block 1122 or block 1124, the process passes to block 1136.

At block 1136, the automated design tool determines whether or not the selected module instance includes at least one additional other child local clock domain. If so, the automated design tool updates variable $C_j$ to refer to a next other child local clock domain. The process then returns to block 1112 and following blocks, which have been described. If, however, the automated design tool determines at block 1136 that all additional other child local clock domains different than child clock domain $C_i$ been processed via variable $C_j$, the automated design tool additionally determines at block 1140 if any child local clock domains remain that have not been processed via variable $C_i$. If not, the automated design tool updates variable $C_i$ to refer to a next child local clock domain (block 1142), and the process returns to block 1110 and following blocks, which have been described. If, however, a negative determination is made at block 1140, the automated design tool recursively invokes the process of FIG. 11 (block 1144) to process the module of the selected child instance. The automated design tool then determines of any additional child instances at the same level of hierarchy as the child instance selected at block 1106 remain unprocessed. If so, the automated design tool selects a next child instance to process (block 1148), and the process returns to block 1108 and following blocks, which have been described. If, however, the automated design tool determines at block 1146 that all child instances have been processed, the process of FIG. 11 ends at block 1150.

Referring now to FIG. 12, there is depicted a high-level logical flowchart of an exemplary process for reconciling specifications of a child module against a parent module in accordance with one embodiment. The process of FIG. 12 begins at block 1200, for example, when invoked at block 1122 or block 1124. The process then proceeds to block 1202, which illustrates the automated design tool determining whether or not the child specification established in a visit to a different instance of the child module in question specifies a handling type of ILLEGAL. If so, no change is made to the child specification (block 1204), and the process of FIG. 12 ends at block 1238 without invoking the process of FIG. 13.

In response to a negative determination at block 1202, the process passes to block 1206, which illustrates the automated design tool determining whether or not the parent specification established for the clock domain crossing in question specifies a handling type of ILLEGAL. If so, the automated design tool updates the child specification to specify a handling type of ILLEGAL (block 1208). The process of FIG. 12 then ends at block 1238 without invoking the process of FIG. 13.

In response to a negative determination at block 1206, the process proceeds to block 1210, which illustrates the automated design tool determining whether or not the parent specification established for the clock domain crossing in question specifies a handling type of DIRECT. This includes the case in which the process of FIG. 12 is invoked from block 1122 of FIG. 11. If so, the automated design tool invokes the process of FIG. 13 to map the child fence control signal to an inactive state because no fence is required (block 1212). The process of FIG. 12 thereafter ends at block 1238.

In response to a negative determination at block 1210, the process proceeds to block 1214, which illustrates the automated design tool determining whether or not the child specification established for the clock domain crossing in question specifies a handling type of DIRECT. If so, the automated design tool changes the child specification to match its parent specification (block 1216) and invokes the process of FIG. 13 to add and/or connect a child fence control signal (block 1218). The process of FIG. 12 thereafter ends at block 1238.

In response to a negative determination at block 1214, the process proceeds to block 1220, which illustrates the automated design tool determining whether or not the parent specification established for the child module in question specifies a handling type of FENCE-IN (specifying a fence powered by the source domain). If so, the automated design tool additionally determines at block 1222 whether or not the child specification established for the child module in question specifies a handling type of FENCE-IN. If not, the process passes to block 1226, which is described below. If, however, the automated design tool makes an affirmative determination at block 1222, the automated design tool invokes the process of FIG. 13 to connect a child fence control signal to the parent's fence control signal (block 1236). The process of FIG. 12 thereafter ends at block 1238.

In response to a negative determination at block 1220, the process proceeds to block 1224, which illustrates the automated design tool determining whether or not the child specification established for the child module in question specifies a handling type of FENCE-IN. If so, the automated design tool additionally determines at block 1226 whether or not the parent's local power domain assigned to the source clock domain is the same as the local power domain assigned to the sink clock domain. If not, the process passes to block 1228, which illustrates the automated design tool reporting an error. Thereafter, the process of FIG. 12 ends at block 1238. If, however, the automated design tool makes an affirmative determination at block 1226, the automated design tool invokes the process of FIG. 13 to connect a child fence control signal to the parent's fence control signal (block 1236). The process of FIG. 12 thereafter ends at block 1238.

In response to a negative determination at block 1224, the process proceeds to block 1230, which illustrates the automated design tool determining whether or not the child specification specifies a handling type of TRANS, indicating the need to insert a voltage level translator. If so, the process passes to block 1236, which has been described. If, however, a negative determination is made at block 1230, the automated design tool additionally determines whether or not the parent specification specifies a handling type of TRANS (block 1232). If not, the automated design tool invokes the process of FIG. 13 to connect a child fence control signal to the parent's fence control signal (block 1236). If, however, the automated design tool makes an affirmative determination at block 1232, the automated design tool changes the child specification to specify a handling type of TRANS (block 1234) and then invokes the process of FIG. 13 at block 1236. Following block 1236, the process of FIG. 12 ends at block 1238.

With reference now to FIG. 13, there is illustrated a high-level logical flowchart of an exemplary process for locating and connecting, or mapping, fence control signals in a child module in accordance with one embodiment. The process of FIG. 13 begins at block 1300, for example, at block 1212, 1218, or 1236 of FIG. 12. The process then proceeds from block 1300 to block 1302, which illustrates the automated design tool determining whether or not the child specification specifies a tied fence control. This includes the case in which the child specification has a handling of DIRECT, or the child specification has a handling of TRANS but no fence control is required. If so, the automated design tool additionally determines at block 1304 if the parent specification specified a tied fence control or a DIRECT handling type. If so, the process terminates at block 1330. If, however, the automated design tool makes a negative determination at block 1304, the process passes to block 1318, which is described below.

In response to a negative determination at block 1302, the process proceeds to block 1306, which illustrates the automated design tool determining whether or not the child fence control signal is connected, meaning that it has been mapped to a parent fence control signal. If not, the automated design tool additionally determines at block 1308 if the parent specification specified a tied fence control or a DIRECT handling type. If so, the automated design tool maps the child fence control to a tie-inactive at the parent, meaning that within the parent's module, the fence control pin of the child instance will be tied inactive (block 1310). Thereafter, the process terminates at block 1330. If, however, the automated design tool makes a negative determination at block 1308, the automated design tool connects (maps) the child fence control signal to the parent's fence control signal (block 1314). Thereafter, the process of FIG. 13 ends at block 1330.

In response to an affirmative determination at block 1306, the process proceeds to block 1312, which illustrates the automated design tool determining whether or not the child's fence control signal is already connected (mapped) per the parent's specification. If so, the process ends at block 1330. If, however, the automated design tool makes a negative determination at block 1312, the automated design tool determines at block 1316 whether or not the parent specification specified a tied fence control or a DIRECT handling type. If not, the process passes to block 1318, which illustrates the automated design tool determining whether or not the module includes an existing split fence control signal that is compatible with the parent's fence control signal. A split fence control signal is one created by either of blocks 1322 and 1328, which are described below. To be compatible, the existing split fence control signal must be mapped to the parent specification's fence control signal; it must have been created (split) during the visit to the current child instance, and it must be directly or indirectly split from the currently specified child fence control signal, or from a tie-inactive if block 1318 was arrived at from block 1304. If such a split fence control signal exists, the automated design tool changes the child's specification to specify the existing split fence control signal instead of the previously specified child fence control signal (block 1320). If, however, the automated design tool makes a negative determination at block 1318, the automated design tool creates a new split child fence control signal and connects (maps) it to the parent's fence control signal (block 1322). The automated design tool additionally changes the child's specification to specify the newly created split child fence control signal. The newly created split child fence control signal is said to be "split from" the previously specified child fence control signal or tied inactive fence control. The previously specified child fence control signal, if any, is said to be the "origin" of the newly created child fence control signal. Following block 1320 or block 1322, the process of FIG. 13 ends at block 1330.

In response to an affirmative determination at block 1316, the process proceeds to block 1324, which illustrates the automated design tool determining whether or not the module includes an existing split fence control that is compatible with the parent's specification. To be compatible, the existing split fence control signal must be mapped to a tie-inactive; it must have been created (split) during the visit to the current child instance, and it must be directly or indirectly split from the currently specified child fence control signal. If such a split fence control signal exists, the automated design tool changes the child's specification to specify the existing split fence control signal instead of the previously specified child fence control signal (block 1326). If, however, the automated design tool makes a negative determination at block 1324, the automated design tool creates a new split child fence control signal and maps it to a tie-inactive, meaning that the fence control pin of the child instance will be tied inactive in the parent module (block 1328). Following block 1326 or block 1328, the process of FIG. 13 ends at block 1330.

Table III below shows an example of a Local Domain Crossing Constraints table for module REG2 that is generated through the process of block 310 of FIG. 3 and FIGS. 11-13. It should be noted that Table III refers only to local clock domains CLKX, CLKY and CLKZ of module REG2.

TABLE III

| Clock Domain Crossing Source Domains → Sink Domain | Handling | Allow False Crossing? | Fence Control |
|---|---|---|---|
| CLKX → CLKY | ILLEGAL | N/A | N/A |
| CLKX → CLKZ | FENCE-OUT | yes | FEN |
| CLKY → CLKX | TRANS | yes | none |
| CLKY → CLKZ | TRANS | yes | none |
| CLKZ → CLKX | DIRECT | N/A | N/A |
| CLKZ → CLKY | ILLEGAL | N/A | N/A |

In addition to creating local crossing constraints, block 310 creates local fence control signals as needed and maps them up the hierarchy to either global fence control signals or ties them to be inactive (e.g., ties to ground). Table III refers to a fence control signal FEN. The FEN signal is mapped to global fence control PWRDOWN at instance 106, but is mapped to tie-to-inactive (ground) at instance 110, as shown in FIG. 2A.

Figure 14:
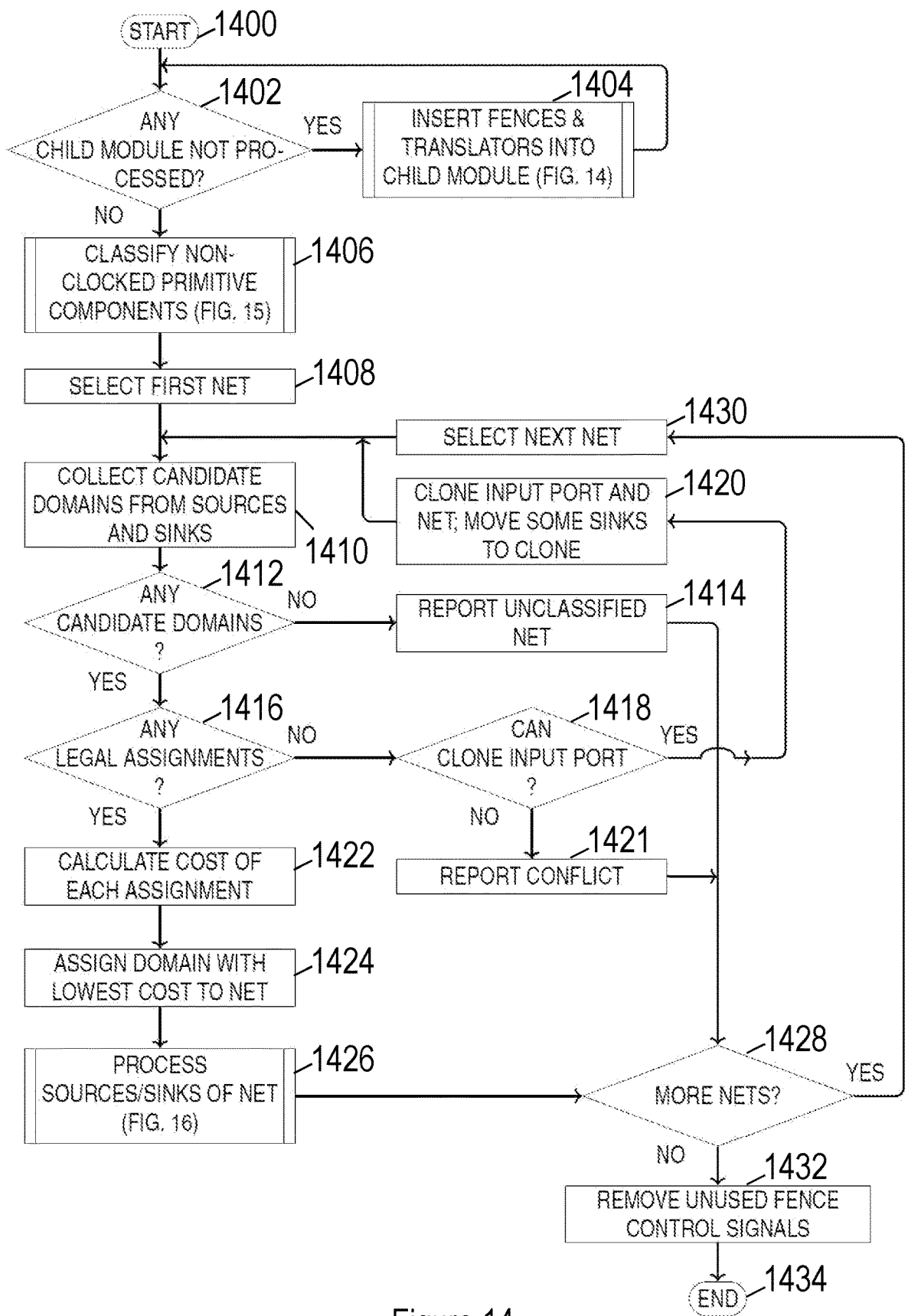
FIG. 14 is a high-level logical flowchart of an exemplary process for inserting fences and voltage level translators in modules of a modular circuit design in accordance with one embodiment.

Referring again to FIG. 3, the process proceeds from block 310 to block 312, which illustrates the automated design tool invoking the process of FIG. 14 on the top module (e.g. TOP) of the modular circuit design in order to insert fences and level translators as needed in each module. Before the automated design tool can insert fences and level translators in each module, the automated design tool assigns a local clock domain to each primitive component or module port that was not already assigned a domain at block 306. In the described embodiment, clocked primitive components and certain module output and bidi ports are each assigned a local clock domain at block 306. Consequently, in the described embodiment, at block 312, the automated design tool assigns domains to non-clocked primitive components, module input ports, and any output/bidi ports that were not assigned a domain at block 306.

In at least some embodiments, the automated design tool performs the processing depicted at block 312 during another traversal of the hierarchical instance tree. In the illustrated example, during this traversal, the automated design tool visits each module only once at the first instance of the module encountered. For example, assuming the traversal reaches instance 110 (i.e., RCV:REG2) prior to instance 106 (i.e., XMIT:REG2), the automated design tool processes module REG2 when the traversal reaches instance 110 and ignores instance 106.

Referring now to FIG. 14, there is depicted a high-level logical flowchart of an exemplary process for inserting fences and voltage level translators in modules of a modular circuit design in accordance with one embodiment. The process of FIG. 14 begins at block 1400, for example, in response to invocation of the process at block 312 of FIG. 3, and then proceeds to block 1402. At block 1402, the automated design tool determines whether or not any child module of the present module (e.g., the module TOP) has not been processed. If so, the process recursively calls the process of FIG. 14 to insert fences and translators, as needed, into each module referenced in the hierarchical instance tree (block 1404). In response to reaching the bottom level of the instance tree, as indicated by a negative determination at block 1402, the automated design tool classifies all non-clocked primitive components by the process of FIG. 15 (block 1406).

The process then proceeds to block 1408, which illustrates the automated design tool selecting a first net of the module for processing. The process then proceeds to blocks 1410-1428, which form an iterative loop in which all nets of the module are processed. In this processing loop, the automated design tool collects candidate domains for the selected net based on the sources and sinks of the net (block 1410). A source of a net is a module input or bidi port that connects to the net, a primitive component connected to the net via an output or bidi pin, or a child instance output or bidi pin connected to the net. A sink of a net is a module output or bidi port that connects to the net, a primitive component connected to the net via an input or bidi pin, or a child instance input or bidi pin connected to the net. A candidate domain is a local clock domain assigned to any port, primitive component, or child instance pin that is connected to the net. A child instance pin is classified with the parent local clock domain to which is mapped the child local clock domain assigned to the corresponding child module port, e.g., by the processing of the child module at block 1404. The automated design tool determines at block 1412 if any candidate domains are found. If no candidate domains are found, as indicated by a negative determination at block 1412, the automated design tool reports the selected net as being unclassified (block 1414) and then selects a next net, if any, in the module for processing, as shown at blocks 1428 and 1430.

If, however, the automated design tool determines at block 1412 that at least one candidate domain was collected, the automated design tool additionally determines at block 1416 if any legal assignment of a candidate domain to the net is possible. An assignment of a local clock domain to a net forms a crossing to the net from any source of the net (e.g., primitive component or port) that is assigned a different local clock domain. Such an assignment also forms a crossing from the net to any sink of the net that is assigned a different local clock domain. The assignment is legal if all crossings formed by the assignment are permitted by the local domain crossing constraints table (see, e.g., Table III). If no candidate domain assignment is legal, the process passes to block 1418, which illustrates the automated design tool determining whether or not the net is driven by an input port of the current module that can be cloned (replicated). In some modular circuit designs, an input port of a module can be cloned if permitted by the designer or the design process. The cloning of an input port means that, at all instances of the given module, the input pin corresponding to the input port is also cloned and must be connected to the driver of the original input pin. If a positive determination is made at block 1418, the automated design tool clones the input port and the selected net and moves one or more of the sinks of the net to the clone net (block 1420). Thereafter, the process returns to block 1410 and following blocks, which have been described. If the automated design tool determines at block 1418 that the input port cannot be cloned, the automated design tool reports a conflict for the selected net (block 1421) and then selects a next net, if any, in the module for processing, as shown at blocks 1428 and 1430.

In response to an affirmative determination at block 1416, the automated design tool performs a "cost analysis" of assigning a given candidate domain to the net based on the local clock domains assigned to its sources and sinks (block 1422). The cost analysis can be based on the cost of adding fences and level translators that would be needed by any crossings resulting from the assignment. For example, a fence can be assigned a cost of 1, and a level translator can be assigned a cost of 5. With these cost metrics, the automated design tool would favor the addition of 3 fences over the addition of 1 level translator. The assignment cost may factor in the type of fence or translator needed and/or whether the fence or translator should be positioned toward the source or sink of a crossing (if specified) and/or whether the assignment would create a false crossing. Many such pricing schemes are possible, and no specific scheme is required. The automated design tool then assigns the local clock domain with the lowest cost to the net (block 1424). If there are multiple candidate assignments that have the lowest cost, the automated design tool may choose one arbitrarily or according to some priority scheme among domains. Following block 1424, the process proceeds to block 1426, which illustrates the automated design tool processing each of the sources and sinks of the net via the process depicted in FIG. 16. The automated design tool then selects a next net, if any, in the module for processing, as shown at blocks 1428 and 1430. In response to a determination at block 1428 that all nets of the module have been processed, the automated design tool removes any unused fence control signals in the module that were added in the processing performed at block 310 of FIG. 3 (block 1432). A fence control signal is unused if it was not connected to any fence or level translator in the given module, and it was not connected to any child instance, or the child's fence control signal to which it was connected was similarly removed during the processing of the child module at block 1404. Thereafter, the process of FIG. 14 ends at block 1434.

Figure 15:
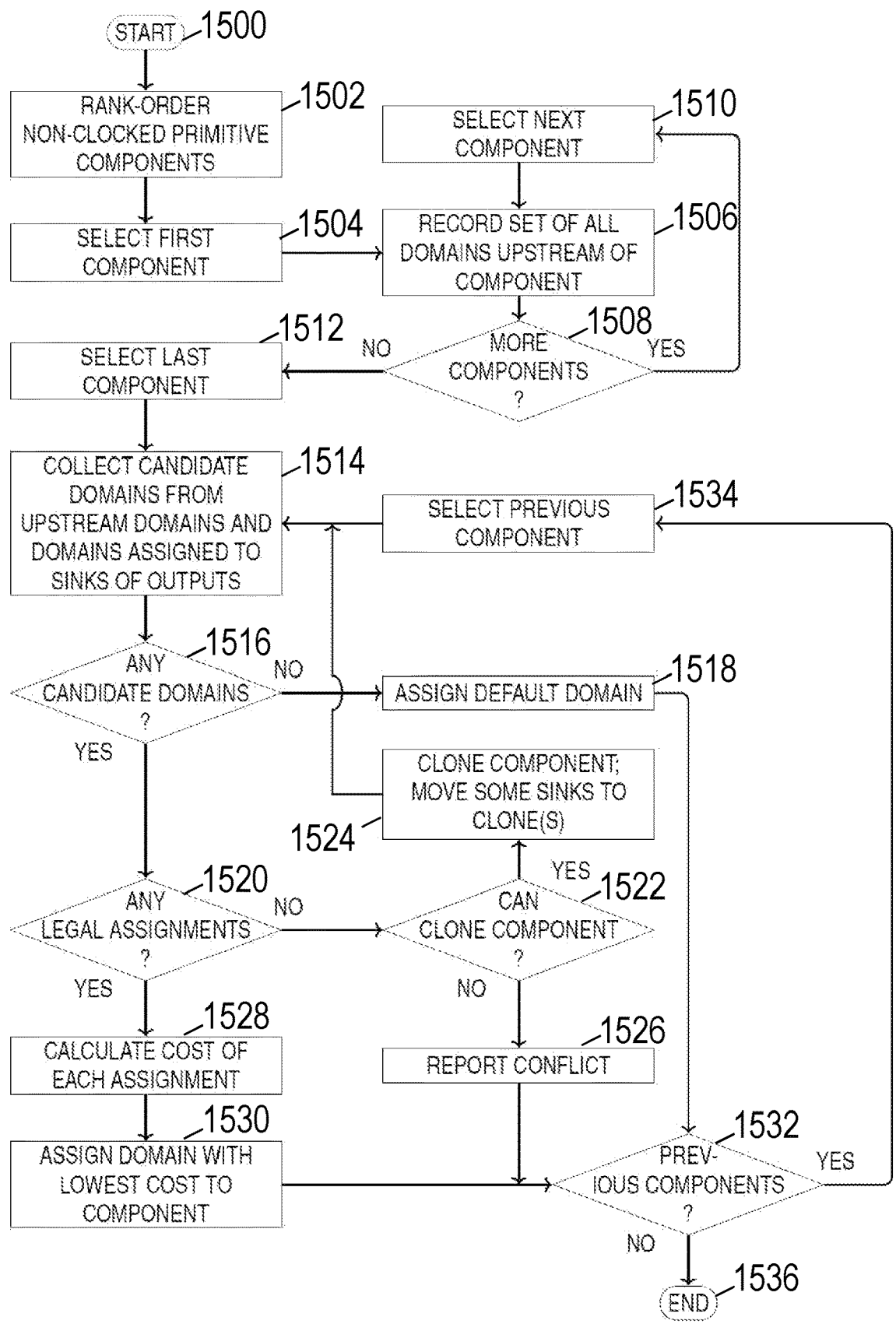
FIG. 15 is a high-level logical flowchart of an exemplary process for classifying non-clocked primitive components in accordance with one embodiment.

With reference to FIG. 15, there is illustrated a high-level logical flowchart of an exemplary process for classifying non-clocked primitive components in accordance with one embodiment. The process begins at block 1500, for example, when invoked at block 1406 of FIG. 14. The process then proceeds to block 1502, which illustrates the automated design tool producing a rank-ordering of the non-clocked primitive components within the selected module. A rank ordering is a sequence in which each non-clocked primitive component is positioned within the sequence such that no input of the non-clocked primitive component is a combinational function of a different non-clocked primitive component appearing later in the sequence. The automated design tool then selects the first component among the non-clocked primitive components in the sequence (block 1504). The automated design tool then records a set of all local clock domains upstream of the selected component (block 1506). With respect to the first non-clocked primitive component in the rank-ordered sequence, the only domains appearing upstream of the given clocked component are those assigned to the clocked primitive components and child instance output/bidi pins, if any, feeding its inputs. As indicated at block 1508-1510, the automated design tool then iterates through each component in the rank-ordered sequence, recording the set of all domains upstream of each component. With respect to each component processed at block 1506, the only domains appearing upstream of the given component are those assigned to clocked primitive components and child instance output/bidi pins, if any, feeding its inputs, and those recorded for non-clocked primitive components, if any, feeding its inputs, of which all must have been processed earlier by the iteration of blocks 1506-1510 due to the rank ordering. After all the components in the sequence are processed, the automated design tool selects the last component in the rank-ordered sequence (block 1512).

At block 1514, the automated design tool collects candidate domains, if any, from all upstream domains recorded for the selected component by block 1506 and from all domains assigned to sinks of outputs. For the last component in the rank-ordered sequence, selected at block 1512, the only domains assigned to sinks of outputs are those assigned to the clocked primitive components and child instance input/bidi pins, if any, sinking its outputs, and those domains assigned to module output/bidi ports, if any, driven by the component's outputs. The automated design tool determines at block 1516 if any candidates domains were found. If no candidate domains were found, as indicated by a negative determination at block 1516, the automated design tool assigns a default local clock domain to the non-clocked primitive component (block 1518) and then selects a previous component, if any, in the rank-ordered sequence for processing, as shown at blocks 1532 and 1534.

If, however, the automated design tool determines at block 1516 that at least one candidate domain was collected, the automated design tool additionally determines at block 1520 if any legal assignment of a candidate domain to the non-clocked primitive component is possible. An assignment of a local clock domain to a non-clocked primitive component forms a crossing to the component from any different clock domain among the set of upstream domains. Such an assignment also forms a crossing from the component to any sink of its outputs that is assigned a different local clock domain. The assignment is legal if all crossings formed by the assignment are permitted by the local domain crossing constraints table (see, e.g., Table III). If no candidate domain assignment is legal, the process passes to block 1522, which illustrates the automated design tool determining whether or not the non-clocked primitive component can be cloned (replicated). In some modular circuit designs, a non-clocked primitive component can be cloned if permitted by the designer or the design process. The inputs of the cloned component must be connected to the same nets (signals), respectively, as the inputs of the original component being cloned. Such cloning would only be warranted if there are multiple clock domains assigned to the sinks of its outputs. If such cloning is permitted, the automated design tool clones the non-clocked primitive component and moves at least one sink to the cloned component (block 1524). An example of such a clone is inverter 220 attached to the top-level input port DIN1E in FIG. 2A. This non-clocked primitive component was cloned from inverter 120 to avoid creating a false crossing from global clock domain EXT to CLKB or vice versa, both of which are disallowed by the global specification of Table II. It should be noted that top-level input port DIN1E was itself cloned from top-level input port DIN1 by the process of block 1420 of FIG. 14 following the cloning of inverter 120. The original input port DIN1 was renamed to DIN1B in this example to indicate it is assigned clock domain CLKB, whereas input port DIN1E is assigned clock domain EXT. Following block 1524, the process returns to block 1514, which has been described. If the automated design tool determines at block 1522 that no clone component can be created, the automated design tool reports a conflict for the selected component (block 1526). The automated design tool then selects a previous component, if any, in the rank-ordered sequence for processing, as shown at blocks 1532 and 1534.

In response to an affirmative determination at block 1520, the automated design tool performs a "cost analysis" of assigning a given domain to the selected non-clocked primitive component based on the domains that source its input pins and the domains assigned to sinks of its output pins (block 1528). The automated design tool then assigns the domain with the lowest cost to the non-clocked primitive component (block 1530). If there are multiple candidate assignments that have the lowest cost, the automated design tool may choose one arbitrarily or according to some priority scheme among domains. Following block 1530, the automated design tool then selects a next previous non-clocked primitive component, if any, in the sequence for processing, as shown at blocks 1532 and 1534. In response to a determination at block 1532 that all primitive non-clocked primitive components of the module have been processed, the process of FIG. 15 ends at block 1536.

For the exemplary modular circuit design of FIG. 1, the process of FIG. 15 will assign to AND gate A1 124 of module REG2 the local clock domain CLKZ based on the upstream domains assigned to flip-flops FF1 116 and FF2 122 (i.e., CLKX and CLKZ, respectively) and the domain assigned to output port R2 (CLKZ), as shown in FIG. 10. The process of FIG. 15 will assign to inverter 126 the local clock domain CLKY based on the assignment of CLKY to output port R3. The assignments of local clock domains to all clocked and non-clocked primitive components will in turn determine which local power and ground rail should be connected to each primitive component. The automated design tool will connect to each primitive component, or otherwise represent such connection in the modified modular circuit design, the local power rail corresponding to the local power domain assigned to the local clock domain that is assigned to the component. The automated design tool will similarly connect the local ground rail corresponding to the local ground domain assigned to said local power domain. For example, AND gate A1 124 of module REG2, having been assigned local clock domain CLKZ, is connected to power rail VDDZ and ground rail GNDX, as shown in FIG. 2B. Power rail VDDZ corresponds to local power domain VDDZ which is assigned to local clock domain CLKZ, as shown in FIG. 10. Similarly, ground rail GNDX corresponds to local ground domain GNDX which is assigned to local power domain VDDZ.

Figure 16:
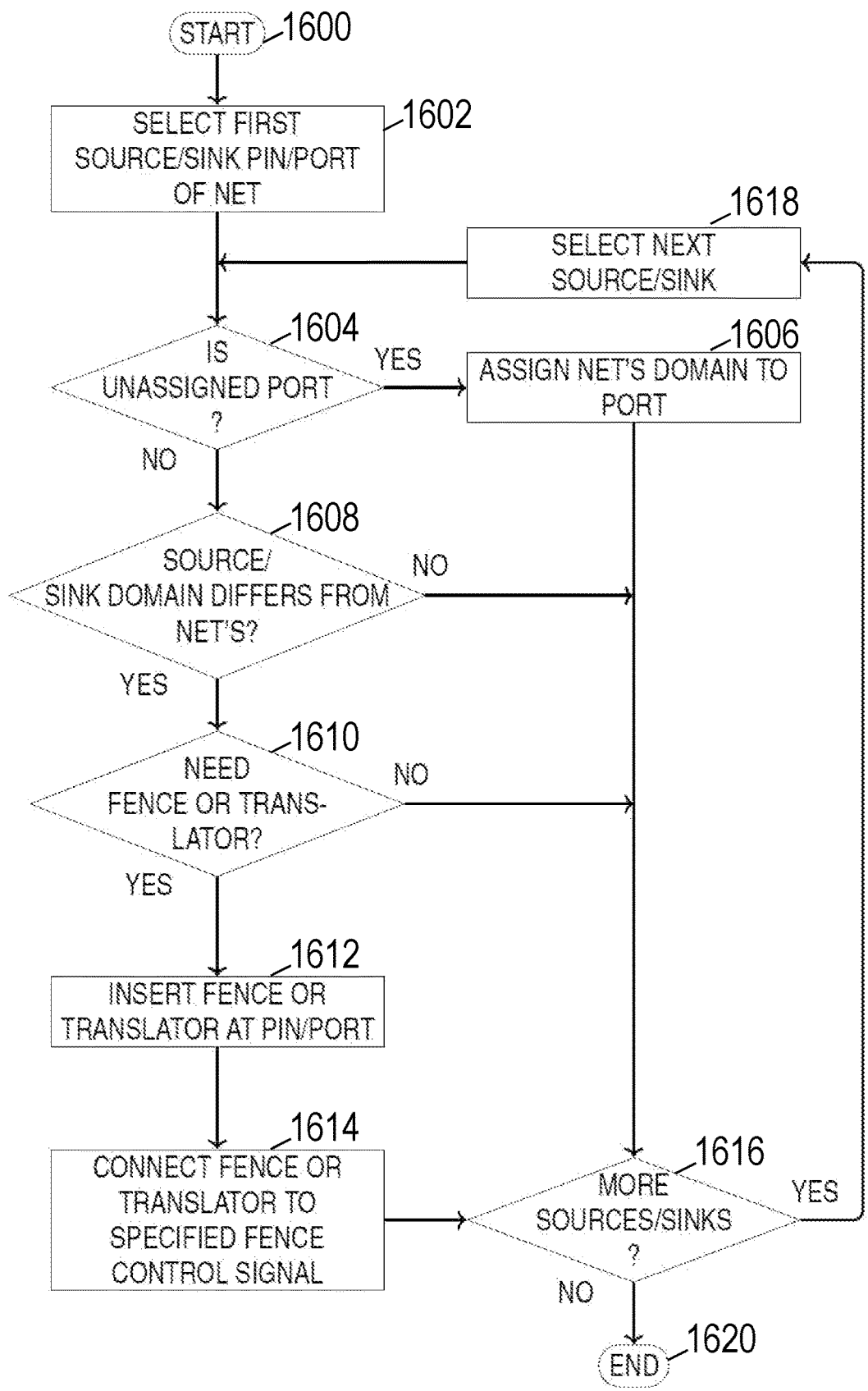
FIG. 16 is a high-level logical flowchart of an exemplary process for inserting fences and voltage level translators at domain boundaries in accordance with one embodiment.

Referring now to FIG. 16, there is depicted a high-level logical flowchart of an exemplary process for inserting fences and voltage level translators at domain boundaries in accordance with one embodiment. In FIG. 16, after a net has been assigned a local clock domain, the automated design tool iterates over all pins and ports connected to the net. If a pin's or port's assigned domain differs from that of the net, this difference implies a crossing between the pin/port and the net. Accordingly, the automated design tool consults the local crossing specification determined at block 310 and will insert a fence or level translator as specified. The process of FIG. 16 also assigns the net's domain to any unassigned input, output or bidi port connected to the net.

The process of FIG. 16 begins at block 1600, for example, in response to invocation of the process of FIG. 16 at block 1426 of FIG. 14. The process then proceeds to block 1602, which illustrates the automated design tool selecting a first source or sink pin or port of the currently selected net. At block 1604, the automated design tool determines if the currently selected pin or port is an unassigned port. If so, the automated design tool assigns the domain of the net to the port (block 1606). The process then proceeds to block 1616, which is described below.

In response to a determination at block 1604 that the selected pin or port is not an unassigned port, the automated design tool determines whether the domain of the source or sink differs from the domain of the net (block 1608) and whether the specification specifies that the resulting crossing requires a fence or translator (block 1610). In response to a negative determination at either of block 1608 or block 1610, the process passes to block 1616, which is described below.

In response to affirmative determinations at block 1608 and 1610, the automated design tool inserts a fence or translator, as specified by the specification, at the currently selected pin/port (block 1612) and connects the fence or translator to the specified fence control signal (block 1614). At block 1616, the automated design tool determines if the selected net includes any more sources or sinks that have not yet been processed in FIG. 16. If so, the automated design tool selects a next source or sink of the net to process at block 1618 and processes the selected source or sink at block 1604 and following blocks, which have been described. If, however, the automated design tool determines all sources and sinks of the selected net have been processed, the process of FIG. 16 ends at block 1620.

For the exemplary modular circuit design of FIG. 1, the process of FIG. 16 will result in the addition of one fence and three level translators. At the input to AND gate A1 124 of module REG2, the automated design tool inserts fence 202 due to the crossing from local clock domain CLKX, assigned to flip-flop FF1 116, to local clock domain CLKZ, assigned to AND gate A1 124. Such a crossing requires a fence, as specified by the local domain crossing constraints table (see, e.g., Table III). The fence is controlled by fence control signal FEN, also specified by Table III. The fence and its connection is shown in FIGS. 2B and 2D. Note that the contents of REG2 are identical in FIGS. 2B and 2D because they are two instances of one module. The automated design tool similarly inserts level translators 206, 208, and 210 to module TOP, as shown in FIG. 2A.

Returning to FIG. 3, after the processing performed at block 312, the automated design tool writes to data storage new HDL design files describing the modified modular circuit design (e.g., modular circuit design 200 of FIGS. 2A-2D), as shown at block 314. Alternatively, the automated design tool may write files containing instructions for another tool to actually modify the modular circuit design. Alternatively, the automated design tool may write data files or memory objects for processing by a subsequent step in the development process of the modular circuit design, e.g., logic synthesis. Following block 314, the process of FIG. 3 ends at block 316.

Figure 17:
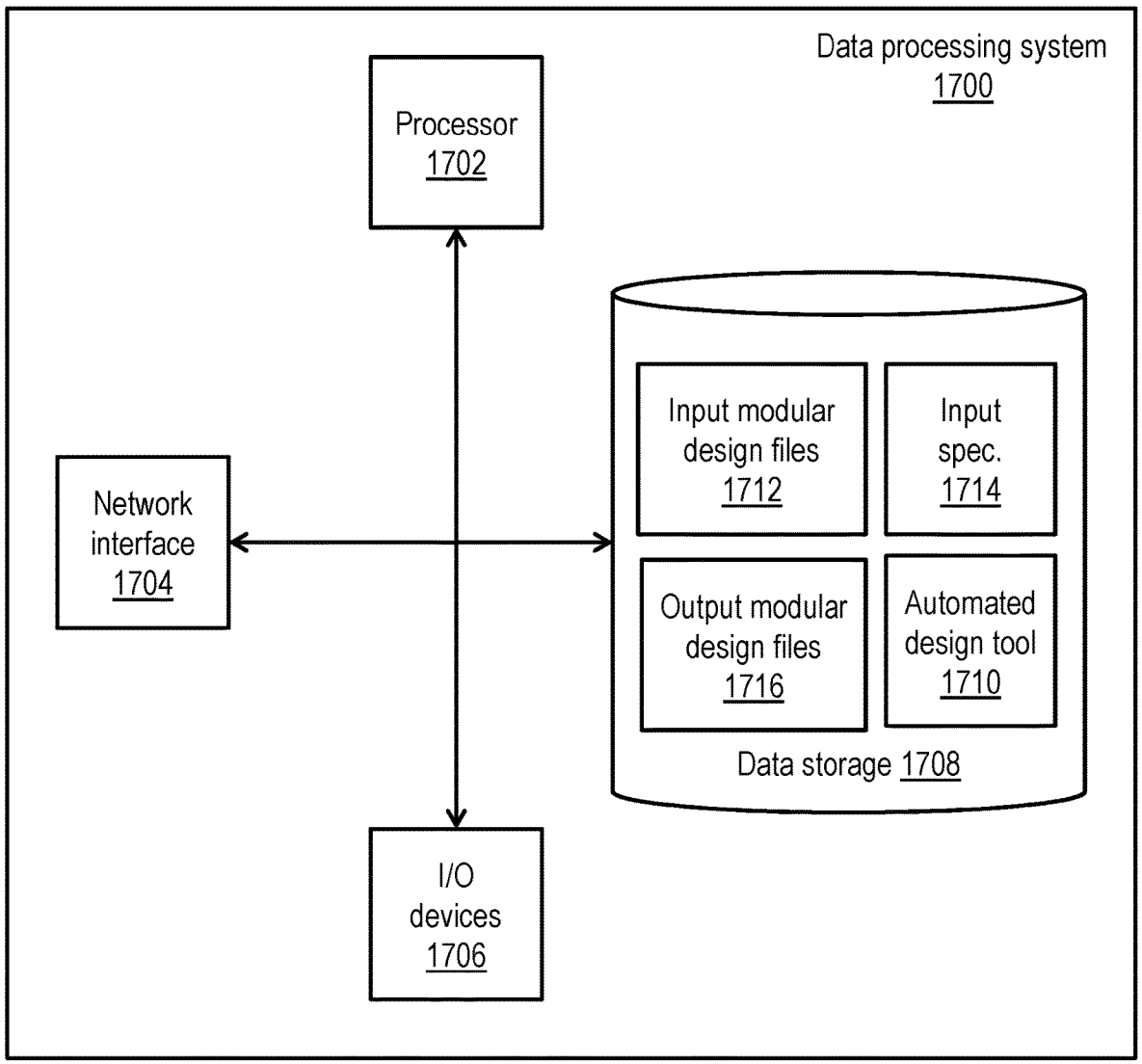
FIG. 17 is a high-level block diagram of a data processing system in accordance with one embodiment.

The present invention may be a system, a method, and/or a computer program product. As one example, the claimed inventions may be realized in a data processing system 1700 as generally shown in FIG. 17. As shown, data processing system 1700 includes a processor 1702 that processes data under the direction of program instructions. Processor 1702 is communicatively coupled to other components of data processing system 1700, such as a network interface 1704, input/output (I/O) devices 1706, and data storage 1708. As shown, data storage 1708, which may include volatile and/or non-volatile storage media, can store software containing program instructions executable by processor 1702, data to be processed by processor 1702, and data produced by the processing performed by processor 1702. For example, in the illustrated embodiment, data storage 1708 stores an automated design tool 1710 as described in detail herein. When executed by processor 1702, automated design tool 1710 receives, as inputs, input modular design files 1712 and input specification 1714. For example, input modular design files 1712 can include the HDL files defining modular circuit design 100 of FIG. 1, and input specification 1714 can include the GDD and GDCC tables provided in Tables I and II. By executing automated design tool 1710 to perform the process shown in FIG. 3, processor 1702 can generate, as outputs, output modular design files 1716. For example, output modular design files 1716 can include the HDL files defining modular circuit design 200 of FIG. 2. It will be appreciated by those skilled in the art that in some embodiments, some or all of automated design tool 1710, input modular design files 1712, input specification 1714, and/or output modular design files 1716 may alternatively or additionally be stored on storage media external to data processing system 1700 that is accessible to processor 1702, for example, via network interface 1704.

If the present invention is implemented as a computer program product, the computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in some embodiments, a specification for a modular circuit design includes a mapping from global clock domains to global voltage domains. A processor assigns, to a first instance of a clocked primitive component, a global voltage domain based on which global clock domain clocks the first instance, automatically adds, to the modular circuit design, first power supply rails to power the first instance, and connects the first power supply rails from the first instance to a first power supply for a first global voltage domain. The processor assigns, to a second instance of the clocked primitive component, a second global voltage domain based on which global clock domain clocks the second instance, automatically adds second power supply rails to power the second instance, and connects the second power supply rails to a second power supply for a second global voltage domain. The processor may then perform further processing, for example, by storing, in data storage, output design files describing the updated modular circuit design.

In some embodiments, a processor receives a list of global constraints for crossings between global clock domains within a modular circuit design including a plurality of hierarchically arranged instances of modules. The processor creates a list of local constraints for crossings between local clock domains of a module in the modular circuit design based on a first mapping from local clock domains to global clock domains at a first instance of the module. The processor modifies the list of local constraints for crossings between local clock domains of the module based on a second mapping from local clock domains to global clock domains at a second instance of the module, such that the resulting list of local constraints satisfies the list of global constraints at both the first instance and the second instance of the module. The processor classifies component pins of the module into clock domains in a manner to satisfy the list of local constraints. The processor automatically inserts into the modular circuit design a component at a pin at which a crossing occurs between different clock domains in order to satisfy the list of local constraints. The processor may then performed further processing, for example, by storing, in data storage, output design files describing an output modular circuit design as updated by the insertion of the component.

While the present invention has been particularly shown as described with reference to one or more preferred embodiments, it will be understood by those skilled in the art that various changes in form and detail may be made therein without departing from the scope of the claims. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method for automatically adding power supply rails to a modular circuit design, the method comprising:
- a processor receiving design data describing an input modular circuit design including a plurality of hierarchically arranged module instances and receiving an input specification for the modular circuit design, wherein the input specification includes a mapping from global clock domains to global voltage domains;
- the processor assigning, to a first instance of a clocked primitive component in the modular circuit design, a global voltage domain based on which global clock domain clocks the first instance of the clocked primitive component;
- the processor automatically adding, to the modular circuit design, first power supply rails to power the first instance of the clocked primitive component and connecting the first power supply rails from the first instance of the clocked primitive component to a first power supply for a first global voltage domain of the modular circuit design;
- the processor assigning, to a second instance of the clocked primitive component, a second global voltage domain based on which global clock domain clocks the second instance of the clocked primitive component;
- the processor automatically adding, to the modular circuit design, second power supply rails to power the second instance of the clocked primitive component and connecting the second power supply rails from the second instance of the clocked primitive component to a second power supply for the second global voltage domain of the modular circuit design; and the processor further processing an output modular circuit design including the first and second power supply rails.

2. The method of claim 1, wherein the first global voltage domain and the second global voltage domain are different voltage domains.

3. The method of claim 1, further comprising:
the processor splitting one of the first and second power supply rails based on a mapping to a single global voltage domain at both the first and second instances being precluded.

4. The method of claim 1, wherein further processing the output modular circuit design includes storing, in data storage, output design files describing the modular circuit design.

5. A method for automatically inserting a component into a modular circuit design to satisfy one or more clock domain crossing constraints, the method comprising:
a processor receiving a global constraint list for crossings between global clock domains within a modular circuit design including a plurality of hierarchically arranged instances of modules;
the processor creating a local constraint list for crossings between local clock domains of a module in the modular circuit design based on a first mapping from local clock domains to global clock domains at a first instance of the module;
the processor modifying the local constraint list based on a second mapping from local clock domains to global clock domains at a second instance of the module, such that the resulting local constraint list satisfies the global constraint list at both the first instance and the second instance of the module;
the processor classifying component pins and ports of the module into clock domains in a manner to satisfy the local constraint list;
the processor automatically inserting into the modular circuit design a component at a pin at which a crossing occurs between different clock domains in order to satisfy the local constraint list; and
the processor further processing an output modular circuit design as updated by the inserting.

6. The method of claim 5, wherein the component comprises a fence.

7. The method of claim 5, wherein the component comprises a voltage level translator.

8. The method of claim 5, further comprising the processor cloning a non-clocked primitive component specified in the modular circuit design to satisfy the local constraint list.

9. The method of claim 5, wherein the further processing includes storing, in data storage, output design files describing the output modular circuit design.

10. A program product for automatically adding power supply rails to a modular circuit design, the program product comprising:
a storage device; and
program instructions within the storage device that, when executed by a processor, cause the processor to perform:
receiving design data describing an input modular circuit design including a plurality of hierarchically arranged module instances and receiving an input specification for the modular circuit design, wherein the input specification includes a mapping from global clock domains to global voltage domains;
assigning, to a first instance of a clocked primitive component in the modular circuit design, a global voltage domain based on which global clock domain clocks the first instance of the clocked primitive component;
automatically adding, to the modular circuit design, first power supply rails to power the first instance of the clocked primitive component and connecting the first power supply rails from the first instance of the clocked primitive component to a first power supply for a first global voltage domain of the modular circuit design;
assigning, to a second instance of the clocked primitive component, a second global voltage domain based on which global clock domain clocks the second instance of the clocked primitive component;
automatically adding, to the modular circuit design, second power supply rails to power the second instance of the clocked primitive component and connecting the second power supply rails from the second instance of the clocked primitive component to a second power supply for the second global voltage domain of the modular circuit design; and
further processing an output modular circuit design including the first and second power supply rails.

11. The program product of claim 10, wherein the first global voltage domain and the second global voltage domain are different voltage domains.

12. The program product of claim 10, wherein the instructions, when executed, further cause the processor to perform:
splitting one of the first and second power supply rails based on a mapping to a single global voltage domain at both the first and second instances being precluded.

13. The program product of claim 10, wherein further processing the output modular circuit design includes storing, in data storage, output design files describing the modular circuit design.

14. A program product for automatically inserting a component into a modular circuit design to satisfy clock constraints, the program product comprising:
a storage device; and
program instructions within the storage device that, when executed by a processor, cause the processor to perform:
receiving a global constraint list for crossings between global clock domains within a modular circuit design including a plurality of hierarchically arranged instances of modules;
creating a local constraint list for crossings between local clock domains of a module in the modular circuit design based on a first mapping from local clock domains to global clock domains at a first instance of the module;
modifying the local constraint list based on a second mapping from local clock domains to global clock domains at a second instance of the module, such that the resulting local constraint list satisfies the global constraint list at both the first instance and the second instance of the module;
classifying component pins and ports of the module into clock domains in a manner to satisfy the local constraint list;
automatically inserting into the modular circuit design a component at a pin at which a crossing occurs between different clock domains in order to satisfy the local constraint list; and
further processing an output modular circuit design as updated by the inserting.

15. The program product of claim 14, wherein the component comprises a fence.

16. The program product of claim 14, wherein the component comprises a voltage level translator.

17. The program product of claim 14, wherein the program code further causes the processor to perform:
cloning a non-clocked primitive component specified in the modular circuit design to satisfy the local constraint list.

18. The program product of claim 14, wherein the further processing includes storing, in data storage, output design files describing the output modular circuit design.

19. A data processing system, comprising:
a processor; and
a storage device communicatively coupled to the processor, wherein the storage device includes program instructions that, when executed by the processor, cause the processor to perform:
receiving design data describing an input modular circuit design including a plurality of hierarchically arranged module instances and receiving an input specification for the modular circuit design, wherein the input specification includes a mapping from global clock domains to global voltage domains;
assigning, to a first instance of a clocked primitive component in the modular circuit design, a global voltage domain based on which global clock domain clocks the first instance of the clocked primitive component;
automatically adding, to the modular circuit design, first power supply rails to power the first instance of the clocked primitive component and connecting the first power supply rails from the first instance of the clocked primitive component to a first power supply for a first global voltage domain of the modular circuit design;
assigning, to a second instance of the clocked primitive component, a second global voltage domain based on which global clock domain clocks the second instance of the clocked primitive component;
automatically adding, to the modular circuit design, second power supply rails to power the second instance of the clocked primitive component and connecting the second power supply rails from the second instance of the clocked primitive component to a second power supply for a second global voltage domain of the modular circuit design; and
further processing an output modular circuit design including the first and second power supply rails.

20. The data processing system of claim 19, wherein the first global voltage domain and the second global voltage domain are different voltage domains.

21. The data processing system of claim 19, wherein the instructions, when executed, further cause the processor to perform:
splitting one of the first and second power supply rails based on a mapping to a single global voltage domain at both the first and second instances being precluded.

22. The data processing system of claim 19, wherein the instructions, when executed, further cause the processor to perform:
receiving a global constraint list for crossings between global clock domains within a modular circuit design including a plurality of hierarchically arranged instances of modules;
creating a local constraint list for crossings between local clock domains of a module in the modular circuit design based on a first mapping from local clock domains to global clock domains at a first instance of the module;
modifying the local constraint list based on a second mapping from local clock domains to global clock domains at a second instance of the module, such that the resulting local constraint list satisfies the global constraint list at both the first instance and the second instance of the module;
classifying component pins and ports of the module into clock domains in a manner to satisfy the local constraint list; and
automatically inserting into the modular circuit design a component at a pin at which a crossing occurs between different clock domains in order to satisfy the local constraint list.

23. The data processing system of claim 22, wherein the component comprises a fence.

24. The data processing system of claim 22, wherein the component comprises a voltage level translator.

25. The data processing system of claim 22, wherein the instructions, when executed, cause the processor to perform:
cloning a non-clocked primitive component specified in the modular circuit design to satisfy the local constraint list.

* * * * *